(12) United States Patent
Lee et al.

(10) Patent No.: US 11,121,378 B2
(45) Date of Patent: Sep. 14, 2021

(54) MIXED CONDUCTOR, ELECTROCHEMICAL DEVICE INCLUDING THE SAME, AND METHOD OF PREPARING MIXED CONDUCTOR

(71) Applicant: Samsung Electronics Co., Ltd., Suwon-si (KR)

(72) Inventors: Hyunpyo Lee, Seoul (KR); Hyukjae Kwon, Suwon-si (KR); Sangbok Ma, Suwon-si (KR); Donghwa Seo, Burlington, MA (US); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/667,996

(22) Filed: Oct. 30, 2019

(65) Prior Publication Data

US 2020/0144626 A1    May 7, 2020

Related U.S. Application Data

(60) Provisional application No. 62/755,640, filed on Nov. 5, 2018.

(30) Foreign Application Priority Data

Dec. 31, 2018    (KR) .................. 10-2018-0174227

(51) Int. Cl.
*H01M 4/86*    (2006.01)
*H01M 12/00*    (2006.01)
(Continued)

(52) U.S. Cl.
CPC ........ *H01M 4/8673* (2013.01); *C01G 23/005* (2013.01); *C01G 45/1292* (2013.01);
(Continued)

(58) Field of Classification Search
CPC ...... H01M 4/131; H01M 4/624; H01M 4/485; H01M 4/8673; H01B 1/08; C01P 2002/32;
(Continued)

(56) References Cited

U.S. PATENT DOCUMENTS

| | | | | |
|---|---|---|---|---|
| 2008/0261113 | A1* | 10/2008 | Huang | ................ H01M 4/485 |
| | | | | 429/221 |
| 2012/0045693 | A1 | 2/2012 | Eom | |

(Continued)

FOREIGN PATENT DOCUMENTS

| | | | | | |
|---|---|---|---|---|---|
| CN | 106602053 | A | * | 4/2017 | ............ H01M 4/485 |
| JP | 2010135237 | A | * | 6/2010 | ............ H01M 4/485 |

(Continued)

OTHER PUBLICATIONS

Wakayama "The effect of the LiCoO2/Li7La3Zr2O12 ratio on the structure and electrochemical properties of nanocomposite cathodes for all-solid-state lithium batteries." J. Mater. Chem. A, 2017, 5, 18816-18822 (Year: 2017).*

(Continued)

*Primary Examiner* — Tri V Nguyen
(74) *Attorney, Agent, or Firm* — Cantor Colburn LLP

(57) ABSTRACT

A mixed conductor represented by Formula 1:

$$A_{4+x}M_{5-y}M'_yO_{12-\delta},\quad \text{Formula 1}$$

wherein, in Formula 1, A is a monovalent cation, M is at least one of a divalent cation, a trivalent cation, or a tetravalent cation, M' is at least one of a monovalent cation, a divalent cation, a trivalent cation, a tetravalent cation, a pentavalent cation, or a hexavalent cation, M and M' are different from each other, and $0.3 \leq x < 3$, $0.01 < y < 2$, and $0 \leq \delta \leq 1$ are satisfied.

20 Claims, 2 Drawing Sheets

(51) Int. Cl.

| | | |
|---|---|---|
| *C01G 23/00* | (2006.01) | |
| *C01G 45/12* | (2006.01) | |
| *C01G 53/00* | (2006.01) | |
| *H01G 11/50* | (2013.01) | |
| *H01B 1/08* | (2006.01) | |
| *H01G 11/46* | (2013.01) | |
| *H01M 4/131* | (2010.01) | |

(52) U.S. Cl.
CPC ............... C01G 53/64 (2013.01); H01B 1/08 (2013.01); H01G 11/46 (2013.01); H01G 11/50 (2013.01); H01M 4/131 (2013.01); H01M 12/00 (2013.01); *C01P 2002/32* (2013.01); *C01P 2002/50* (2013.01); *C01P 2002/72* (2013.01); *C01P 2002/77* (2013.01); *C01P 2006/40* (2013.01)

(58) Field of Classification Search
CPC .. C01G 33/006; C01G 35/006; C01G 37/006; C01G 39/006; C01G 41/00; C01G 47/006; C01G 99/006; C01G 55/002; C01G 29/006; C01G 30/006; C01G 45/1292; C01G 53/64; H01G 11/50
USPC ..................... 252/500, 518.1, 519.1, 519.12
See application file for complete search history.

(56) References Cited

U.S. PATENT DOCUMENTS

2015/0155547 A1\* 6/2015 Tenzer ................. H01M 4/136
429/221
2016/0344024 A1 11/2016 Lee et al.

FOREIGN PATENT DOCUMENTS

| JP | 2014167873 A | 9/2014 |
|---|---|---|
| KR | 1020120017991 A | 2/2012 |
| KR | 101634088 B1 | 6/2016 |
| KR | 1020160136099 A | 11/2016 |

OTHER PUBLICATIONS

Ganapathy et al., "The Fine Line between a Two-Phase and Solid-Solution Phase Transformation and Highly Mobile Phase interfaces in Spinel $Li_{4+x}Ti_5O_{12}$", Advanced Science News, Adv. Energy Mater., 7, 2017, 1601781.

\* cited by examiner

MIXED CONDUCTOR, ELECTROCHEMICAL DEVICE INCLUDING THE SAME, AND METHOD OF PREPARING MIXED CONDUCTOR

CROSS-REFERENCE TO RELATED APPLICATIONS

This application claims priority to and the benefit of U.S. Provisional Application No. 62/755,640, filed on Nov. 5, 2018, in the US Patent Office, and Korean Patent Application No. 10-2018-0174227, filed on Dec. 31, 2018, in the Korean Intellectual Property Office, and all the benefits accruing therefrom under 35 U.S.C. § 119, contents of which are incorporated herein in their entireties by reference.

BACKGROUND

1. Field

The present disclosure relates to a mixed conductor, an electrochemical device including the same, and methods of preparing the mixed conductors.

2. Description of the Related Art

In an electrochemical device, such as a battery, an electrochemical reaction occurs where ions and electrons move along separate movement paths between a plurality of electrodes and then combine at the electrodes.

An ion conductor for transferring ions and an electron conductor for transferring electrons are mixed and arranged in the electrodes.

In the electrodes, for example, an organic liquid electrolyte is used as the ion conductor, and a carbon-based conductive agent is used as the electron conductor. The organic liquid electrolyte and the carbon-based conductive agent are easily decomposed by radicals that are produced by the electrochemical reactions, thereby deteriorating the performance of the battery. In the electrodes, the carbon-based conductive agent inhibits the diffusion/transfer of ions, and the organic liquid electrolyte inhibits the transfer of electrons, so that internal resistance in the battery increases.

Therefore, there remains a need for a conductor that is chemically stable with respect to the byproducts of electrochemical reactions and can simultaneously transfer ions and electrons.

SUMMARY

Provided is a mixed conductor that is chemically stable and simultaneously transfers ions and electrons.

Provided is an electrochemical device including the mixed conductor.

Provided are methods of preparing the mixed conductor.

Additional aspects will be set forth in part in the description which follows and, in part, will be apparent from the description, or may be learned by practice of the presented embodiments.

According to an aspect of an embodiment, there is provided a mixed conductor represented by Formula 1.

$$A_{4+x}M_{5-y}M'_yO_{12-\delta}$$  Formula 1 wherein Formula 1, A is a monovalent cation; M is at least one of a divalent cation, a trivalent cation, or a tetravalent cation; M' is at least one of a monovalent cation, a divalent cation, a trivalent cation, a tetravalent cation, a pentavalent cation, or a hexavalent cation, M and M' are different from each other, and $0.3 \leq x < 3$, $0.01 < y < 2$, and $0 \leq \delta \leq 1$ are satisfied.

According to an aspect of another embodiment, an electrochemical device includes a cathode comprising the mixed conductor; an anode including lithium; and an electrolyte disposed between the cathode and anode.

According to an aspect of another embodiment, a method of preparing a mixed conductor includes: providing a precursor of element A; providing a precursor of element M; providing a precursor of element M'; mixing the precursor of element A, the precursor of element M, and the precursor of element M' to prepare a mixture; and heat-treating the mixture in a solid phase to prepare the mixed conductor, wherein A is a monovalent cation, M is at least one of a divalent cation, a trivalent cation, or a tetravalent cation, M' is at least one of a monovalent cation, a divalent cation, a trivalent cation, a tetravalent cation, a pentavalent cation, or a hexavalent cation; and M and M' are different from each other.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present disclosure, described below, may be variously modified and may have various shapes, so examples of which are illustrated in the accompanying drawings and will be described in detail with reference to the accompanying drawings.

However, it should be understood that the exemplary embodiments according to the concept of the present disclosure are not limited to the embodiments which will be described hereinbelow with reference to the accompanying drawings, but various modifications, equivalents, additions and substitutions are possible, without departing from the scope and spirit of the present disclosure.

The terminology used herein is for the purpose of describing particular embodiments only and is not intended to restrict the present disclosure. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. As used herein the term "/" may be interpreted as "and" or "or" including any and all combinations of one or more of the associated listed items depending on the situation. "Or" means "and/or."

In the drawings, diameters, lengths, and thicknesses are enlarged or reduced in order to clearly illustrate various components, layers, and regions. Like reference numerals refer to like elements throughout the specification. It is to be understood that when a layer, film, region, plate, or the like is referred to as being "on" or "on" another portion throughout the specification, this includes not only the case directly above another portion but also the case where there is another portion in between. Although the terms first, second, etc. may be used herein to describe various elements, these elements should not be limited by these terms. These terms are only used to distinguish one element, from another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the "mixed conductor" refers to a conductor that simultaneously provides ionic conductivity and electronic conductivity. For example, the mixed conductor used herein simultaneously provides ionic and electronic conductivity that are improved as compared with those of $Li_4Ti_5O_{12}$.

Hereinafter, a mixed conductor, an electrochemical device including the same, and methods of preparing the mixed conductor according to an example embodiment will be described in more detail.

A mixed conductor according to an embodiment is represented by Formula 1.

$$A_{4+x}M_{5-y}M'_yO_{12-\delta}$$  Formula 1

In Formula 1, A is a monovalent cation, M is at least one of a divalent cation, a trivalent cation, or a tetravalent cation, M' is at least one of a monovalent cation, a divalent cation, a trivalent cation, a tetravalent cation, a pentavalent cation, or a hexavalent cation, M and M' are different from each other, and $0.3 \le x < 3$, $0.01 < y < 2$, and $0 \le \delta \le 1$ are satisfied. $\delta$ may indicate an oxygen vacancy content.

The mixed conductor has the above composition in which A is a monovalent cation, M is at least one of a divalent cation, a trivalent cation, or a tetravalent cation, a part of M is substituted with at least one M' which is at least one of a monovalent cation, a divalent cation, a trivalent cation, tetravalent cation, a pentavalent cation, or a hexavalent cation, b may indicate an oxygen vacancy content, thereby simultaneously providing improved ionic conductivity and electronic conductivity. Further, the mixed conductor, which is an inorganic oxide, is stable to heat, and is chemically stable to radicals accompanied by electrochemical reactions.

In A, the monovalent cation may be a monovalent alkali metal cation. For example, the monovalent cation may include at least one of Li, Na, or K. Use of Li is mentioned.

M may include at least one of Mg, Ca, Sr, Sc, Y, La, Ce, Pr, Nd, Pm, Sm, Eu, Gd, Tb, Dy, Ho, Er, Tm, Yb, Lu, Cr, Mn, Fe, Ru, Co, Rh, Ni, Pd, Pt, Cu, Au, Zn, Cd, Hg, Al, Ga, In, Tl, Ge, Sn, Pb, Sb, Bi, Po, Zr, Hf, Mo, Tc, Re, Ir, or Ti.

M' may include at least one of Mg, Ca, Sr, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, or Po.

In Formula 1, M and M' are cations having different oxidation numbers from each other. For example, the oxidation number of M' may be smaller than or equal to the oxidation number of M. For example, the oxidation number of M' may be smaller than the oxidation number of M. When the oxidation number of M' is smaller than the oxidation number of M, in order to maintain the overall charge balance, the element A may be further added. Thus, the movement energy barrier of the element A in the mixed conductor may be reduced, and, as a result, the ionic conductivity of the element A may be improved.

In Formula 1, M may be a trivalent cation or a tetravalent cation. For example, M may be Ti or Mn, for example, $Ti^{3+}$, $Ti^{4+}$, $Mn^{3+}$, $Mn^{4+}$.

In Formula 1, M may be Ti, and M' may be at least one of a monovalent cation, a divalent cation, a trivalent cation, a tetravalent cation, a pentavalent cation, or a hexavalent cation. Alternatively, M may be Mn, and M' may be at least one of a monovalent cation, a divalent cation, a trivalent cation, a tetravalent cation, a pentavalent cation, or a hexavalent cation.

In Formula 1, a portion of M may be substituted with M' to form a mixed valent state, thereby obtaining a mixed conductor having remarkably improved electronic conductivity and ionic conductivity.

In Formula 1, x may satisfy $0.3 \leq x \leq 2.5$, $0.3 \leq x \leq 2.0$, $0.5 \leq x < 3.0$, or $0.5 < x < 3.0$. When x satisfies the above range, the movement energy barrier of lithium ions is lowered, and thus lithium ion conductivity is improved.

In Formula 1, y may satisfy $0.01 < y < 2$, $0.01 < y \leq 1.5$, $0.01 < y \leq 1.0$, $0.5 < y < 2$, $0.5 < y \leq 1.5$, or $0.5 < y \leq 1.0$. When y satisfies the above range, the equivalent amount of lithium ions may be increased without changing the crystal structure of the mixed conductor. In addition, when a portion of M is substituted with M', a mixed valent state is formed. While not wanting to be bound by theory, it is understood that, a new state density function is added by the hybrid orbitals formed by mixing the molecular orbitals of M and M', and thus a bandgap between a valence band and a conduction band is reduced. Consequently, the electronic conductivity of the mixed conductor is further improved.

In Formula 1, δ may satisfy $0 \leq \delta \leq 1.0$, $0.1 \leq \delta \leq 0.5$, or $0.5 \leq \delta \leq 0.9$.

The mixed conductor may be represented by Formula 2 or Formula 3.

$$Li_{4+x}Ti_{5-y}M1_yO_{12-\delta} \qquad \text{Formula 2}$$

$$Li_{4+x}Mn_{5-y}M2_yO_{12-\delta} \qquad \text{Formula 3}$$

In Formulae 2 and 3, M1 is at least one of Mg, Ca, Sr, Sc, Y, La, Ce, Pr, Nd, Pm, Sm, Eu, Gd, Tb, Dy, Ho, Er, Tm, Yb, Lu, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, or Po, M2 is at least one of Mg, Ca, Sr, Sc, Y, La, Ce, Pr, Nd, Pm, Sm, Eu, Gd, Tb, Dy, Ho, Er, Tm, Yb, Lu, Ti Zr, Hf, V, Nb, Ta, Cr, Mo, W, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, or Po, and $0.3 \leq x < 3$, $0.01 < y < 2$, and $0 \leq \delta \leq 1$ are satisfied. δ may indicate an oxygen vacancy content.

The mixed conductor may include at least one of $Li_{4+x}Ti_{5-y}Ag_yO_{12-\delta}$ wherein $0.3 \leq x < 3$, $0.01 < y < 2$, and $0 \leq \delta \leq 1$, $Li_{4+x}Ti_{5-y}Mg_yO_{12-\delta}$ wherein $0.3 \leq x < 3$, $0.01 < y < 2$, and $0 \leq \delta \leq 1$; $Li_{4+x}Ti_{5-y}Ca_yO_{12-\delta}$ wherein $0.3 \leq x < 3$, $0.01 < y < 2$, and $0 \leq \delta \leq 1$; $Li_{4+x}Ti_{5-y}Sr_yO_{12-\delta}$ wherein $0.3 \leq x < 3$, $0.01 < y < 2$, and $0 \leq \delta \leq 1$; $Li_{4+x}Ti_{5-y}Mn_yO_{12-\delta}$ wherein $0.3 \leq x < 3$, $0.01 < y < 2$, and $0 \leq \delta \leq 1$; $Li_{4+x}Ti_{5-y}Fe_yO_{12-\delta}$ wherein $0.3 \leq x < 3$, $0.01 < y < 2$, and $0 \leq \delta \leq 1$; $Li_{4+x}Ti_{5-y}Pd_yO_{12-\delta}$ wherein $0.3 \leq x < 3$, $0.01 < y < 2$, and $0 \leq \delta \leq 1$; $Li_{4+x}Ti_{5-y}Pt_yO_{12-\delta}$ wherein $0.3 \leq x < 3$, $0.01 < y < 2$, and $0 \leq \delta \leq 1$; $Li_{4+x}Ti_{5-y}Cu_yO_{12-\delta}$ wherein $0.3 \leq x < 3$, $0.01 < y < 2$, and $0 \leq \delta \leq 1$; $Li_{4+x}Ti_{5-y}Zn_yO_{12-\delta}$ wherein $0.3 \leq x < 3$, $0.01 < y < 2$, and $0 \leq \delta \leq 1$; $Li_{4+x}Ti_{5-y}Cd_yO_{12-\delta}$ wherein $0.3 \leq x < 3$, $0.01 < y < 2$, and $0 \leq \delta \leq 1$; $Li_{4+x}Ti_{5-y}Hg_yO_{12-\delta}$ wherein $0.3 \leq x < 3$, $0.01 < y < 2$, and $0 \leq \delta \leq 1$; $Li_{4+x}Ti_{5-y}Ge_yO_{12-\delta}$ wherein $0.3 \leq x < 3$, $0.01 < y < 2$, and $0 \leq \delta \leq 1$; $Li_{4+x}Ti_{5-y}Sn_yO_{12-\delta}$ wherein $0.3 \leq x < 3$, $0.01 < y < 2$, and $0 \leq \delta \leq 1$; $Li_{4+x}Ti_{5-y}Pb_yO_{12-\delta}$ wherein $0.3 \leq x < 3$, $0.01 < y < 2$, and $0 \leq \delta \leq 1$; $Li_{4+x}Ti_{5-y}Po_yO_{12-\delta}$ wherein $0.3 \leq x < 3$, $0.01 < y < 2$, and $0 \leq \delta \leq 1$; $Li_{4+x}Ti_{5-y}Sc_yO_{12-\delta}$ wherein $0.3 \leq x < 3$, $0.01 < y < 2$, and $0 \leq \delta \leq 1$; $Li_{4+x}Ti_{5-y}Y_yO_{12-\delta}$ wherein $0.3 \leq x < 3$, $0.01 < y < 2$, and $0 \leq \delta \leq 1$; $Li_{4+x}Ti_{5-y}La_yO_{12-\delta}$ wherein $0.3 \leq x < 3$, $0.01 < y < 2$, and $0 \leq \delta \leq 1$; $Li_{4+x}Ti_{5-y}Ce_yO_{12-\delta}$ wherein $0.3 \leq x < 3$, $0.01 < y < 2$, and $0 \leq \delta \leq 1$; $Li_{4+x}Ti_{5-y}Pr_yO_{12-\delta}$ wherein $0.3 \leq x < 3$, $0.01 < y < 2$, and $0 \leq \delta \leq 1$; $Li_{4+x}Ti_{5-y}Nd_yO_{12-\delta}$ wherein $0.3 \leq x < 3$, $0.01 < y < 2$, and $0 \leq \delta \leq 1$; $Li_{4+x}Ti_{5-y}Pm_yO_{12-\delta}$ wherein $0.3 \leq x < 3$, $0.01 < y < 2$, and $0 \leq \delta \leq 1$; $Li_{4+x}Ti_{5-y}Sm_yO_{12-\delta}$ wherein $0.3 \leq x < 3$, $0.01 < y < 2$, and $0 \leq \delta \leq 1$; $Li_{4+x}Ti_{5-y}Eu_yO_{12-\delta}$ wherein $0.3 \leq x < 3$, $0.01 < y < 2$, and $0 \leq \delta \leq 1$; $Li_{4+x}Ti_{5-y}Gd_yO_{12-\delta}$ wherein $0.3 \leq x < 3$, $0.01 < y < 2$, and $0 \leq \delta \leq 1$; $Li_{4+x}Ti_{5-y}Tb_yO_{12-\delta}$ wherein $0.3 \leq x < 3$, $0.01 < y < 2$, and $0 \leq \delta \leq 1$; $Li_{4+x}Ti_{5-y}Dy_yO_{12-\delta}$ wherein $0.3 \leq x < 3$, $0.01 < y < 2$, and $0 \leq \delta \leq 1$; $Li_{4+x}Ti_{5-y}Ho_yO_{12-\delta}$ wherein $0.3 \leq x < 3$, $0.01 < y < 2$, and $0 \leq \delta \leq 1$; $Li_{4+x}Ti_{5-y}Er_yO_{12-\delta}$ wherein $0.3 \leq x < 3$, $0.01 < y < 2$, and $0 \leq \delta \leq 1$; $Li_{4+x}Ti_{5-y}Tm_yO_{12-\delta}$ wherein $0.3 \leq x < 3$, $0.01 < y < 2$, and $0 \leq \delta \leq 1$; $Li_{4+x}Ti_{5-y}Yb_yO_{12-\delta}$ wherein $0.3 \leq x < 3$, $0.01 < y < 2$, and $0 \leq \delta \leq 1$; $Li_{4+x}Ti_{5-y}Lu_yO_{12-\delta}$ wherein $0.3 \leq x < 3$, $0.01 < y < 2$, and $0 \leq \delta \leq 1$; $Li_{4+x}Ti_{5-y}Cr_yO_{12-\delta}$ wherein $0.3 \leq x < 3$, $0.01 < y < 2$, and $0 \leq \delta \leq 1$; $Li_{4+x}Ti_{5-y}Ru_yO_{12-\delta}$ wherein $0.3 \leq x < 3$, $0.01 < y < 2$, and $0 \leq \delta \leq 1$; $Li_{4+x}Ti_{5-y}Co_yO_{12-\delta}$ wherein $0.3 \leq x < 3$, $0.01 < y < 2$, and $0 \leq \delta \leq 1$; $Li_{4+x}Ti_{5-y}Rh_yO_{12-\delta}$ wherein $0.3 \leq x < 3$, $0.01 < y < 2$, and $0 \leq \delta \leq 1$; $Li_{4+x}Ti_{5-y}Ni_yO_{12-\delta}$ wherein $0.3 \leq x < 3$, $0.01 < y < 2$, and $0 \leq \delta \leq 1$; $Li_{4+x}Ti_{5-y}Au_yO_{12-\delta}$ wherein $0.3 \leq x < 3$, $0.01 < y < 2$, and $0 \leq \delta \leq 1$; $Li_{4+x}Ti_{5-y}Al_yO_{12-\delta}$ wherein $0.3 \leq x < 3$, $0.01 < y < 2$, and $0 \leq \delta \leq 1$; $Li_{4+x}Ti_{5-y}Ga_yO_{12-\delta}$ wherein $0.3 \leq x < 3$, $0.01 < y < 2$, and $0 \leq \delta \leq 1$; $Li_{4+x}Ti_{5-y}In_yO_{12-\delta}$ wherein $0.3 \leq x < 3$, $0.01 < y < 2$, and $0 \leq \delta \leq 1$; $Li_{4+x}Ti_{5-y}Tl_yO_{12-\delta}$ wherein $0.3 \leq x < 3$, $0.01 < y < 2$, and $0 \leq \delta \leq 1$; $Li_{4+x}Ti_{5-y}Sb_yO_{12-\delta}$ wherein $0.3 \leq x < 3$, $0.01 < y < 2$, and $0 \leq \delta \leq 1$; $Li_{4+x}Ti_{5-y}Bi_yO_{12-\delta}$ wherein $0.3 \leq x < 3$, $0.01 < y < 2$, and $0 \leq \delta \leq 1$; $Li_{4+x}Ti_{5-y}Zr_yO_{12-\delta}$ wherein $0.3 \leq x < 3$, $0.01 < y < 2$, and $0 \leq \delta \leq 1$; $Li_{4+x}Ti_{5-y}Hf_yO_{12-\delta}$ wherein $0.3 \leq x < 3$, $0.01 < y < 2$, and $0 \leq \delta \leq 1$; $Li_{4+x}Ti_{5-y}V_yO_{12-\delta}$ wherein $0.3 \leq x < 3$, $0.01 < y < 2$, and $0 \leq \delta \leq 1$; $Li_{4+x}Ti_{5-y}Nb_yO_{12-\delta}$ wherein $0.3 \leq x < 3$, $0.01 < y < 2$, and $0 \leq \delta \leq 1$; $Li_{4+x}Ti_{5-y}Ta_yO_{12-\delta}$ wherein $0.3 \leq x < 3$, $0.01 < y < 2$, and $0 \leq \delta \leq 1$; $Li_{4+x}Ti_{5-y}Mo_yO_{12-\delta}$ wherein $0.3 \leq x < 3$, $0.01 < y < 2$, and $0 \leq \delta \leq 1$; $Li_{4+x}Ti_{5-y}W_yO_{12-\delta}$ wherein $0.3 \leq x < 3$, $0.01 < y < 2$, and $0 \leq \delta \leq 1$; $Li_{4+x}Ti_{5-y}Tc_yO_{12-\delta}$ wherein $0.3 \leq x < 3$, $0.01 < y < 2$, and $0 \leq \delta \leq 1$; $Li_{4+x}Ti_{5-y}Re_yO_{12-\delta}$ wherein $0.3 \leq x < 3$, $0.01 < y < 2$, and $0 \leq \delta \leq 1$; $Li_{4+x}Ti_{5-y}Os_yO_{12-\delta}$ wherein $0.3 \leq x < 3$, $0.01 < y < 2$, and $0 \leq \delta \leq 1$; and $Li_{4+x}Ti_{5-y}Ir_yO_{12-\delta}$ wherein $0.3 \leq x < 3$, $0.01 < y < 2$, and $0 \leq \delta \leq 1$); and $Li_{4+x}Mn_{5-y}Ag_yO_{12-\delta}$ wherein $0.3 \leq x < 3$, $0.01 < y < 2$, and $0 \leq \delta \leq 1$; $Li_{4+x}Mn_{5-y}Au_yO_{12-\delta}$ wherein $0.3 \leq x < 3$, $0.01 < y < 2$, and $0 \leq \delta \leq 1$; $Li_{4+x}Mn_{5-y}Tl_yO_{12-\delta}$ wherein $0.3 \leq x < 3$, $0.01 < y < 2$, and $0 \leq \delta \leq 1$; $Li_{4+x}Mn_{5-y}Mg_yO_{12-\delta}$ wherein $0.3 \leq x < 3$, $0.01 < y < 2$, and $0 \leq \delta \leq 1$; $Li_{4+x}Mn_{5-y}Ca_yO_{12-\delta}$ wherein $0.3 \leq x < 3$, $0.01 < y < 2$, $0 \leq \delta \leq 1$; $Li_{4+x}Mn_{5-y}Sr_yO_{12-\delta}$ wherein $0.3 \leq x < 3$, $0.01 < y < 2$, and $0 \leq \delta \leq 1$; $Li_{4+x}Mn_{5-y}Fe_yO_{12-\delta}$ wherein $0.3 \leq x < 3$, $0.01 < y < 2$, and $0 \leq \delta \leq 1$; $Li_{4+x}Mn_{5-y}Ru_yO_{12-\delta}$ wherein $0.3 \leq x < 3$, $0.01 < y < 2$, and $0 \leq \delta \leq 1$; $Li_{4+x}Mn_{5-y}Co_yO_{12-\delta}$ wherein $0.3 \leq x < 3$, $0.01 < y < 2$, and $0 \leq \delta \leq 1$; $Li_{4+x}Mn_{5-y}Ni_yO_{12-\delta}$ wherein $0.3 \leq x < 3$, $0.01 < y < 2$, and $0 \leq \delta \leq 1$; $Li_{4+x}Mn_{5-y}Pd_yO_{12-\delta}$ wherein $0.3 \leq x < 3$, $0.01 < y < 2$, and $0 \leq \delta \leq 1$; $Li_{4+x}Mn_{5-y}Pt_yO_{12-\delta}$ wherein $0.3 \leq x < 3$, $0.01 < y < 2$, and $0 \leq \delta \leq 1$; $Li_{4+x}Mn_{5-y}Cu_yO_{12-\delta}$ wherein $0.3 \leq x < 3$, $0.01 < y < 2$, and $0 \leq \delta \leq 1$; $Li_{4+x}Mn_{5-y}Zn_yO_{12-\delta}$ wherein $0.3 \leq x < 3$, $0.01 < y < 2$, and $0 \leq \delta \leq 1$; $Li_{4+x}Mn_{5-y}Cd_yO_{12-\delta}$ wherein $0.3 \leq x < 3$, $0.01 < y < 2$, and $0 \leq \delta \leq 1$; $Li_{4+x}Mn_{5-y}Hg_yO_{12-\delta}$ wherein $0.3 \leq x < 3$, $0.01 < y < 2$, and $0 \leq \delta \leq 1$; $Li_{4+x}Mn_{5-y}Ge_yO_{12-\delta}$ wherein $0.3 \leq x < 3$, $0.01 < y < 2$, and $0 \leq \delta \leq 1$; $Li_{4+x}Mn_{5-y}Sn_yO_{12-\delta}$ wherein $0.3 \leq x < 3$, $0.01 < y < 2$, and $0 \leq \delta \leq 1$; $Li_{4+x}Mn_{5-y}Pb_yO_{12-\delta}$ wherein $0.3 \leq x < 3$, $0.01 < y < 2$, and $0 \leq \delta \leq 1$; $Li_{4+x}Mn_{5-y}Po_yO_{12-\delta}$ wherein $0.3 \leq x < 3$, $0.01 < y < 2$, and $0 \leq \delta \leq 1$; $Li_{4+x}Mn_{5-y}Sc_yO_{12-\delta}$ wherein $0.3 \leq x < 3$, $0.01 < y < 2$, and $0 \leq \delta \leq 1$; $Li_{4+x}Mn_{5-y}Y_yO_{12-\delta}$ wherein $0.3 \leq x < 3$, $0.01 < y < 2$, and $0 \leq \delta \leq 1$; $Li_{4+x}Mn_{5-y}La_yO_{12-\delta}$ wherein $0.3 \leq x < 3$, $0.01 < y < 2$, and $0 \leq \delta \leq 1$; $Li_{4+x}Mn_{5-y}Ce_yO_{12-\delta}$ wherein $0.3 \leq x < 3$, $0.01 < y < 2$, and $0 \leq \delta \leq 1$; $Li_{4+x}Mn_{5-y}Pr_yO_{12-\delta}$ wherein $0.3 \leq x < 3$, $0.01 < y < 2$, and $0 \leq \delta \leq 1$; $Li_{4+x}Mn_{5-y}Nd_yO_{12-\delta}$ wherein $0.3 \leq x < 3$, $0.01 < y < 2$, and $0 \leq \delta \leq 1$; $Li_{4+x}Mn_{5-y}Pm_yO_{12-\delta}$ wherein $0.3 \leq x < 3$, $0.01 < y < 2$, and $0 \leq \delta \leq 1$; $Li_{4+x}Mn_{5-y}Sm_yO_{12-\delta}$ wherein $0.3 \leq x < 3$, $0.01 < y < 2$, and $0 \leq \delta \leq 1$; $Li_{4+x}Mn_{5-y}Eu_yO_{12-\delta}$ wherein $0.3 \leq x < 3$, $0.01 < y < 2$, and $0 \leq \delta \leq 1$; $Li_{4+x}Mn_{5-y}Gd_yO_{12-\delta}$ wherein $0.3 \leq x < 3$, $0.01 < y < 2$, and $0 \leq \delta \leq 1$; $Li_{4+x}Mn_{5-y}Tb_yO_{12-\delta}$ wherein $0.3 \leq x < 3$, $0.01 < y < 2$, and $0 \leq \delta \leq 1$; $Li_{4+x}Mn_{5-y}Dy_yO_{12-\delta}$ wherein $0.3 \leq x < 3$, $0.01 < y < 2$, and $0 \leq \delta \leq 1$; $Li_{4+x}Mn_{5-y}Ho_yO_{12-\delta}$ wherein $0.3 \leq x < 3$, $0.01 < y < 2$, and $0 \leq \delta \leq 1$; $Li_{4+x}Mn_{5-y}Er_yO_{12-\delta}$ wherein $0.3 \leq x < 3$, $0.01 < y < 2$, and $0 \leq \delta \leq 1$; $Li_{4+x}Mn_{5-y}Tm_yO_{12-\delta}$ wherein $0.3 \leq x < 3$, $0.01 < y < 2$, and $0 \leq \delta \leq 1$; $Li_{4+x}Mn_{5-y}Yb_yO_{12-\delta}$ wherein $0.3 \leq x < 3$, $0.01 < y < 2$, and $0 \leq \delta \leq 1$; $Li_{4+x}Mn_{5-y}Lu_yO_{12-\delta}$ wherein $0.3 \leq x<3$, $0.01<y<2$, and $0 \leq \delta \leq 1$; $Li_{4+x}Mn_{5-y}Ti_yO_{12-\delta}$ wherein $0.3 \leq x<3$, $0.01<y<2$, and $0 \leq \delta \leq 1$; $Li_{4+x}Mn_{5-y}Zr_yO_{12-\delta}$ wherein $0.3 \leq x<3$, $0.01<y<2$, and $0 \leq \delta \leq 1$; $Li_{4+x}Mn_{5-y}Hf_yO_{12-\delta}$ wherein $0.3 \leq x<3$, $0.01<y<2$, and $0 \leq \delta \leq 1$; $Li_{4+x}Mn_{5-y}V_yO_{12-\delta}$ wherein $0.3 \leq x<3$, $0.01<y<2$, and $0 \leq \delta \leq 1$; $Li_{4+x}Mn_{5-y}Nb_yO_{12-\delta}$ wherein $0.3 \leq x<3$, $0.01<y<2$, and $0 \leq \delta \leq 1$; $Li_{4+x}Mn_{5-y}Ta_yO_{12-\delta}$ wherein $0.3 \leq x<3$, $0.01<y<2$, and $0 \leq \delta \leq 1$; $Li_{4+x}Mn_{5-y}Cr_yO_{12-\delta}$ wherein $0.3 \leq x<3$, $0.01<y<2$, and $0 \leq \delta \leq 1$; $Li_{4+x}Mn_{5-y}Mo_yO_{12-\delta}$ wherein $0.3 \leq x<3$, $0.01<y<2$, and $0 \leq \delta \leq 1$; $Li_{4+x}Mn_{5-y}W_yO_{12-\delta}$ wherein $0.3 \leq x<3$, $0.01<y<2$, and $0 \leq \delta \leq 1$; $Li_{4+x}Mn_{5-y}Tc_yO_{12-\delta}$ wherein $0.3 \leq x<3$, $0.01<y<2$, and $0 \leq \delta \leq 1$; $Li_{4+x}Mn_{5-y}Re_yO_{12-\delta}$ wherein $0.3 \leq x<3$, $0.01<y<2$, and $0 \leq \delta \leq 1$; $Li_{4+x}Mn_{5-y}Os_yO_{12-\delta}$ wherein $0.3 \leq x<3$, $0.01<y<2$, and $0 \leq \delta \leq 1$; $Li_{4+x}Mn_{5-y}Rh_yO_{12-\delta}$ wherein $0.3 \leq x<3$, $0.01<y<2$, and $0 \leq \delta \leq 1$; $Li_{4+x}Mn_{5-y}Ir_yO_{12-\delta}$ wherein $0.3 \leq x<3$, $0.01<y<2$, and $0 \leq \delta \leq 1$; $Li_{4+x}Mn_{5-y}Al_yO_{12-\delta}$ wherein $0.3 \leq x<3$, $0.01<y<2$, and $0 \leq \delta \leq 1$; $Li_{4+x}Mn_{5-y}Ga_yO_{12-\delta}$ wherein $0.3 \leq x<3$, $0.01<y<2$, and $0 \leq \delta \leq 1$; $Li_{4+x}Mn_{5-y}In_yO_{12-\delta}$ wherein $0.3 \leq x<3$, $0.01<y<2$, and $0 \leq \delta \leq 1$; $Li_{4+x}Mn_{5-y}Sb_yO_{12-\delta}$ wherein $0.3 \leq x<3$, $0.01<y<2$, and $0 \leq \delta \leq 1$; or $Li_{4+x}Mn_{5-y}Bi_yO_{12-\delta}$ wherein $0.3 \leq x<3$, $0.01<y<2$, and $0 \leq \delta \leq 1$.

The mixed conductor may include a phase having a spinel crystal structure. For example, the mixed conductor may be formed to have a spinel crystal structure. The mixed conductor may be electrochemically stable because it has a spinel crystal structure.

The mixed conductor may have a peak at a diffraction angle of $19.0 \pm 2.5°$ 2-theta ($2\theta$), a diffraction angle of $36.0 \pm 2.5°$ $2\theta$, and a diffraction angle of $43.0 \pm 2.5°$ $2\theta$, when analyzed by XRD using Cu K$\alpha$ radiation. Since the mixed conductor may have peaks at a plurality of specific diffraction angles, it may include a phase having a spinel crystal structure.

The mixed conductor has suitable electronic conductivity and suitable ionic conductivity. For example, the mixed conductor simultaneously has an ionic conductivity and an electronic conductivity which may be greater than that of $Li_4Ti_5O_{12}$, which has a spinel structure.

The mixed conductor has an electronic conductivity of about $4.5 \times 10^{-9}$ Siemens per centimeter (S/cm) or more. For example, the mixed conductor may have an electronic conductivity of about $5 \times 10^{-9}$ S/cm or more, about $1 \times 10^{-8}$ S/cm or more, about $1 \times 10^{-7}$ S/cm or more, about $1 \times 10^{-6}$ S/cm or more, about $1 \times 10^{-5}$ S/cm or more, or about $1 \times 10^{-4}$ S/cm or more. For example, the mixed conductor may have an electronic conductivity of $4.5 \times 10^{-9}$ S/cm to about $1 \times 10^{-3}$ S/cm, about $5 \times 10^{-9}$ S/cm to about $5 \times 10^{-4}$ S/cm, about $1 \times 10^{-8}$ S/cm to about $8 \times 10^{-4}$ S/cm, about $1 \times 10^{-7}$ S/cm to about $1 \times 10^{-5}$ S/cm, about $1 \times 10^{-6}$ S/cm to about $2 \times 10^{-5}$ S/cm, about $1 \times 10^{-5}$ S/cm to about $3 \times 10^{-4}$ S/cm, or about $1 \times 10^{-4}$ S/cm to about $2 \times 10^{-2}$ S/cm. When the mixed conductor has such electronic conductivity, the internal resistance of the electrochemical device including the mixed conductor is reduced.

The mixed conductor has an ionic conductivity of about $7 \times 10^{-8}$ S/cm or more. For example, the mixed conductor may have an ionic conductivity of about $8 \times 10^{-8}$ S/cm or more, about $9 \times 10^{-8}$ S/cm or more, about $1 \times 10^{-7}$ S/cm or more, or about $1 \times 10^{-6}$ S/cm or more. For example, the mixed conductor may have an ionic conductivity of about $7 \times 10^{-8}$ S/cm to about $1 \times 10^{-4}$ S/cm, about $8 \times 10^{-8}$ S/cm to about $5 \times 10^{-4}$ S/cm, about $9 \times 10^{-8}$ S/cm to about $1 \times 10^{-5}$ S/cm, about $1 \times 10^{-7}$ S/cm to about $8 \times 10^{-6}$ S/cm, or about $1 \times 10^{-6}$ S/cm to about $9 \times 10^{-6}$ S/cm. The mixed conductor has such ionic conductivity, so that the internal resistance of the electrochemical device including the mixed conductor is reduced.

The bandgap of the mixed conductor between a valence band and a conduction band is less than the bandgap of $Li_4Ti_5O_{12}$. For example, the bandgap of the mixed conductor between the valence band and the conduction band is about 2 electron volts (eV) or less, about 1.8 eV or less, about 1.6 eV or less, about 1.4 eV or less, or about 1.2 eV or less. For example, the bandgap of the mixed conductor between the valence band and the conduction band is about 2 eV to about 1.2 eV, about 2.3 eV to about 1.4 eV, about 2.0 eV to about 1.6 eV, about 1.8 eV to about 1.4 eV, about 1.6 eV to about 1.2 eV, about 1.6 eV to about 1 eV. When the bandgap of the mixed conductor between the valence band and the conduction band has such low values, the movement of electrons from the valence band to the conduction band is facilitated, so that the electronic conductivity of the mixed conductor is improved.

The mixed conductor may include oxygen vacancy. While not wanting to be bound by theory, it is understood that the oxygen vacancy provides improved ionic conductivity. For example, when the mixed conductor includes an oxygen vacancy, the position of a state density function moves near Fermi energy (Ef), and thus the bandgap between the valence band and the conduction band is reduced. As a result, the electronic conductivity of the mixed conductor is further improved.

Figure 2:
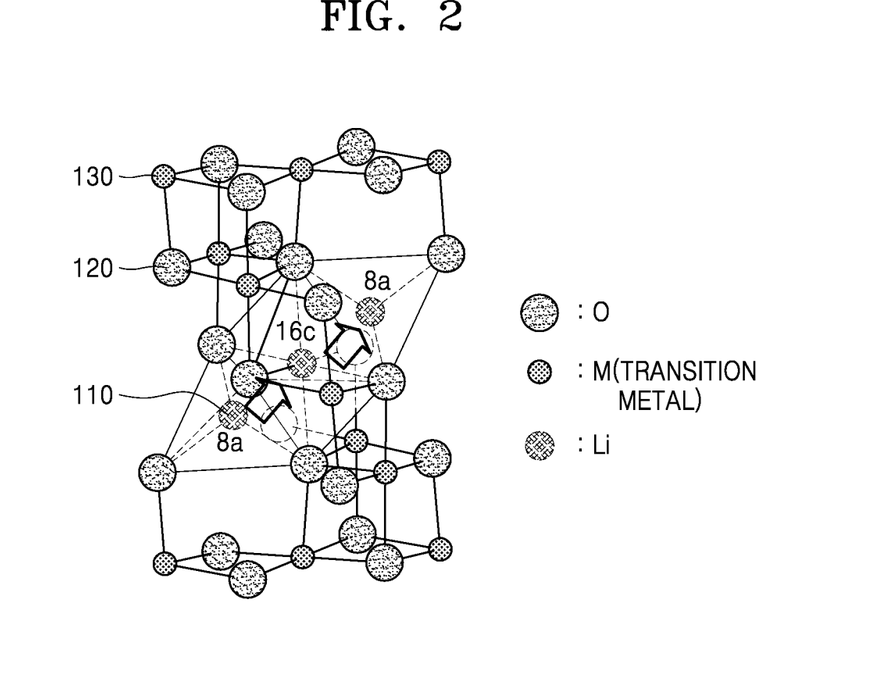
FIG. 2 is a schematic view illustrating the movement of lithium ions in the crystal structure of a mixed conductor according to an embodiment of the present disclosure.

In the mixed conductor, for example, referring to FIG. 2, A is located on at least one of a tetrahedral 8a site and an octahedral 16c site of a spinel crystal structure. Referring to FIG. 2, when A is lithium, an activation energy (Ea, 8a->16c->8a) for a lithium transition from a tetrahedral 8a site to another tetrahedral 8a site via the octahedral 16c site is less than an activation energy for a lithium transition from a tetrahedral 8a site to another tetrahedral 8a site via an octahedral 16c site (Ea, 8a->16c->8a) in $Li_4Ti_5O_{12}$. When the mixed conductor has an activation energy (Ea, 8a->16c->8a) for a lithium transition from a tetrahedral 8a site to another tetrahedral 8a site via an octahedral 16c site, which is less than a lithium transition from a tetrahedral 8a site to another tetrahedral 8a site via an octahedral 16c site in $Li_4Ti_5O_{12}$, the transfer and/or diffusion of lithium ions in the mixed conductor becomes easier. As a result, the ionic conductivity of the mixed conductor is increased as compared with $Li_4Ti_5O_{12}$.

An electrochemical device according to another embodiment may include the aforementioned mixed conductor. When the electrochemical device include a mixed conductor which is chemically stable and simultaneously transfers ions and electrons, the deterioration of the electrochemical device is inhibited.

Examples of the electrochemical device may include, but are not limited to, a battery, an accumulator, a supercapacitor, a fuel cell, a sensor, and an electrochromic device. Any suitable electronic chemical device may be used as long as it may be used in the art.

The battery may be, for example, a primary battery or a secondary battery. Examples of the battery may include, but are not limited to, a lithium battery and a sodium battery. Any suitable battery may be used as long as it may be used in the art. Examples of the lithium battery may include, but are not limited to, a lithium ion battery and a lithium-air battery. Any suitable lithium battery may be. Examples of the electrochromic device may include, but are not limited to, an electrochemical mirror, an electrochemical window, an electrochemical screen, and an electrochemical façade. Any suitable electrochromic device may be used as long as it may be used in the art.

The electrochemical device including the mixed conductor is, for example, a lithium-air battery.

The lithium-air battery may include a cathode. The cathode may be an air electrode. The cathode may be placed, for example, on a cathode current collector.

The cathode may include a conductive material. The conductive material may be porous. While not wanting to be bound by theory, it is understood that the porosity of the conductive material facilitates the penetration of air. Any suitable conductive material may be used as long as it has suitable porosity and/or conductivity and may be available in the art. For example, the conductive material may be a carbon-based material having suitable porosity. Examples of the carbon-based material may include, but are not limited to, carbon black, graphite, graphene, active carbon, and carbon fiber. Any suitable carbon-based material may be used. The conductive material may be, for example, a metallic material. Examples of the metallic material may include metal fiber, metal mesh, and metal powder. Examples of the metal powder may include copper powder, silver powder, and aluminum powder. The conductive material may be, for example, an organic conductive material. Examples of the organic conductive material may include a polyphenylene derivative or a polythiophene derivative. The conductive material may be used alone or as a mixture thereof. The cathode may include the mixed conductor as a conductive material, and the cathode may further include the aforementioned conductive materials in addition to the mixed conductor.

The cathode may further include a catalyst for oxidation and/or reduction of oxygen. Examples of the catalyst may include, but are not limited to, a metal catalyst comprising a metal, such as platinum, gold, silver, palladium, ruthenium, rhodium, or osmium; an oxide catalysts such as manganese oxide, iron oxide, cobalt oxide, or nickel oxide; an organic metal catalysts such as cobalt phthalocyanine. Any suitable catalyst may be used as long as it may be used in the art.

The catalyst may be supported on, for example, a carrier. Examples of the carrier may include an oxide carrier, a zeolite carrier, a clay-based mineral carrier, and a carbon carrier. The oxide carrier may be, for example, a metal oxide carrier and may include at least one metal of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide carrier may include, for example, alumina, silica, zirconium oxide, or titanium dioxide. Examples of the carbon carrier may include, but are not limited to, a carbon black such as Ketjen black, acetylene black, channel black, or lamp black; a graphite such as natural graphite, artificial graphite, or expanded graphite; an active carbon; or a carbon fiber. Any suitable carrier may be used as long.

The cathode may further include, for example, a binder. The binder may include, for example, a thermoplastic resin or a thermosetting resin. Examples of the binder may include, and is not limited to, polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or as a mixture thereof. Any suitable binder may be used.

The cathode may be prepared by, for example, mixing the conductive material, the oxygen oxidation-reduction catalyst, and the binder to obtain a mixture, adding an appropriate solvent to the mixture to obtain a cathode slurry, and then applying the cathode slurry onto the surface of a substrate and drying the applied cathode slurry, or compression-forming the cathode slurry onto the substrate. The substrate may be, for example, a cathode current collector, a separator, or a solid electrolyte film. The cathode current collector may be, for example, a gas diffusion layer. The conductive material may include the mixed conductor, and, in the cathode, the oxygen oxidation-reduction catalyst and the binder may be omitted according to the kind of a desired cathode.

The lithium-air battery may include an anode. The anode may include lithium.

The anode may be, for example, a lithium metal thin film or a lithium-based alloy thin film. The lithium-based alloy may be, for example, an alloy of lithium and aluminum, tin, magnesium, indium, calcium, titanium, or vanadium.

The lithium-air battery may include an electrolyte layer between the cathode and the anode.

The electrolyte layer may include at least one electrolyte of a solid electrolyte, a gel electrolyte, or a liquid electrolyte. The solid electrolyte, the gel electrolyte, and the liquid electrolyte are not limited, and any suitable electrolyte may be used.

The solid electrolyte may include, but is not limited to, at least one of a solid electrolyte including an ionically conducting inorganic material, a solid electrolyte including a polymeric ionic liquid and a lithium salt, a solid electrolyte including an ionically conducting polymer and a lithium salt, or a solid electrolyte including an electronically conducting polymer. Any suitable solid electrolyte may be used.

The ionically conducting inorganic material may include, but is not limited to, at least one of a glassy or amorphous metal ion conductor, a ceramic active metal ion conductor, or a glassy ceramic active metal ion conductor. Any suitable ionically conducting inorganic material may be used. The ionically conducting inorganic material may be made in the form of an ionically conducting inorganic particle or a sheet thereof.

For example, the ionically conducting inorganic material may include at least one of $BaTiO_3$, $Pb(Zr_aTi_{1-a})O_3$(PZT) wherein $0 \le a \le 1$, $Pb_{1-x}La_xZr_{1-y}Ti_yO_3$(PLZT) wherein $0 \le x < 1$, $0 \le y < 1$; $Pb(Mg_3Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$, and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ wherein $0 \le x \le 1$, $0 \le y \le 1$, $0 \le a \le 1$, and $0 \le b \le 1$; lithium lanthanum titanate ($Li_xLa_yTiO_3$, wherein $0<x<2$, $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$, $0<y<2$), $SiS_2$, a ($Li_xSi_yS_z$-based glass, wherein $0<x<3$, $0<y<2$, and $0<z<4$), $P_2S_5$, a ($Li_xP_yS_z$ based glass, wherein $0<x<3$, $0<y<3$, and $0<z<7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$- based ceramics, or garnet-based ceramics ($Li_{3+x}La_3M_2O_{12}$ wherein M=Te, Nb, Zr), or a combination thereof.

The polymeric ionic liquid (PIL) may include a repeating unit which may include i) at least one cation of an ammonium-based cation, a pyrrolidinium-based cation, a pyridinium-based cation, a pyrimidinium-based cation, an imidazolium-based cation, a piperidinum-based cation, a pyrazolium-based cation, an oxazolium-based cation, a pyridazinium-based cation, a phosphonium-based cation, a sulfonium-based cation, a triazole-based cation, or mixtures thereof, and ii) at least one anion of $BF_4$—, $PF_6$—, $AsF_6$—, $SbF_6$—, $AlCl_4$—, $HSO_4$—, $ClO_4$—, $CH_3SO_3$—, $CF_3CO_2$—, $(CF_3SO_2)_2N$—, Cl—, Br—, I—, $BF_4$—, $SO_4^-$, $PF_6$—, $ClO_4$—, $CF_3SO_3^-$, $CF_3CO_2^-$, $(C_2F_5SO_2)_2N$—, $(C_2F_5SO_2)(CF_3SO_2)N$—, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$.

Examples of the polymeric ionic liquid may include poly(diallyldimethylammonium trifluoromethanesulfonyl)imide), poly(1-allyl-3-methylimidazolium trifluoromethanesulfonyl)imide), or poly((N-Methyl-N-propylpiperidinium bis(trifluoromethanesulfonyl)imide).

The ionically conducting polymer may include at least one ionically conductive repeating unit of an ether-based monomer, an acrylic monomer, a methacrylic monomer, or a siloxane-based monomer.

Examples of the ionically conducting polymer may include, but are not limited to, polyethylene oxide (PEO), polyvinyl alcohol (PVA), polyvinyl pyrrolidone (PVP), polyvinyl sulfone, polypropylene oxide (PPO), polymethyl methacrylate, polyethyl methacrylate, polydimethylsiloxane, polyacrylic acid, polymethacrylic acid, polymethyl acrylate, polyethyl acrylate, poly 2-ethylhexyl acrylate, polybutyl methacrylate, poly 2-ethylhexyl methacrylate, polydecyl acrylate, polyethylene vinyl acetate, a phosphate ester polymer, polyester sulfide, polyvinylidene fluoride (PVdF), polyvinylidene fluoride, and Li-substituted NAFION (Li-Nafion). Any suitable ionically conducting polymer may be used.

Examples of the electronically conducting polymer may include, but are not limited to, polyphenylene derivatives and polythiophene derivatives. Any suitable electronically conducting polymer may be used.

The gel electrolyte may be obtained by adding a low-molecular solvent to the solid electrolyte between the anode and the cathode. The gel electrolyte may be obtained by adding a solvent, an oligomer, or the like, which may be a low-molecular organic compound, to a polymer. The gel electrolyte may be obtained by adding a solvent, an oligomer, or the like, which may be a low-molecular organic compound, to the aforementioned polymer electrolyte.

The liquid electrolyte may include a solvent and a lithium salt.

The solvent may include, but is not limited to, at least one of an organic solvent, an ionic liquid, and an oligomer. Any suitable solvent may be used as long as it may be a liquid at room temperature (25° C.).

The organic solvent may include at least one of an ether-based solvent, a carbonate-based solvent, an ester-based solvent, or a ketone-based solvent. Examples of the organic solvent may include, but are not limited to, propylene carbonate, ethylene carbonate, fluoroethylene carbonate, vinylethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane, 2-methyltetrahydrofuran, and tetrahydrofuran. Any suitable organic solvent may be used as long as it may be a liquid at room temperature (25° C.).

The ionic liquid (IL) may include i) at least one cation of an ammonium-based cation, a pyrrolidinium-based cation, a pyridinium-based cation, a pyrimidinium-based cation, an imidazolium-based cation, a piperidinum-based cation, a pyrazolium-based cation, an oxazolium-based cation, a pyridazinium-based cation, a phosphonium-based cation, a sulfonium-based cation, a triazole-based cation, or mixtures thereof, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$.

The lithium salt may include, but is not limited to, at least one of lithium bis(trifluoromethanesulfonyl)imide (LiTFSI), $LiPF_6$, $LiBF_4$, $LiAsF_6$, $LiClO_4$, $LiNO_3$, lithium bis(oxalato)borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate (LiTfO). Any suitable lithium salt may be used as long as it may be used in the art. The concentration of the lithium salt is, for example, about 0.01 M to 5.0 M.

The lithium-air battery may further include a separator between the cathode and the anode. The separator is not limited as long as it can withstand the potential range of the lithium-air battery. For example, the separator may include a polymer nonwoven fabric such as a nonwoven fabric made of polypropylene or a nonwoven fabric made of polyphenylene sulfide, a porous film made of polyolefin such as polyethylene or polypropylene, or a glass fiber, and may include a combination of two or more thereof.

The electrolyte layer may have, for example, a structure in which a separator is impregnated with a solid polymer electrolyte or a structure in which a separator is impregnated with a liquid electrolyte. The electrolyte layer having a structure in which a separator is impregnated with a solid polymer electrolyte may be prepared by, for example, applying a solid polymer electrolyte film onto one side or both sides of the separator and then simultaneously roll-pressing the solid polymer electrolyte film and the separator. The electrolyte layer having a structure in which a separator is impregnated with a liquid electrolyte may be prepared by, for example, injecting a liquid electrolyte including a lithium salt into the separator.

The lithium-air battery may be completed by placing an anode at one side surface in a case, placing an electrolyte layer on the anode, placing a cathode on the electrolyte layer, placing a porous cathode current collector on the cathode, placing a pressing member on the porous cathode current collector to transfer air to an air electrode, and pushing the pressing member to fix a cell. The case may be separated into an upper portion contacting the anode and a lower portion contacting the air electrode, and an insulating resin may be interposed between the upper portion and the lower portion to electrically insulate the cathode from the anode.

The lithium-air battery may be used for both primary and secondary batteries. The shape of the lithium-air battery is not limited, and examples thereof may include a coin, a button, a sheet, a laminate, a cylinder, a plate, and a cone. The lithium-air battery may be also applicable to medium and large batteries for electric vehicles.

Figure 3:
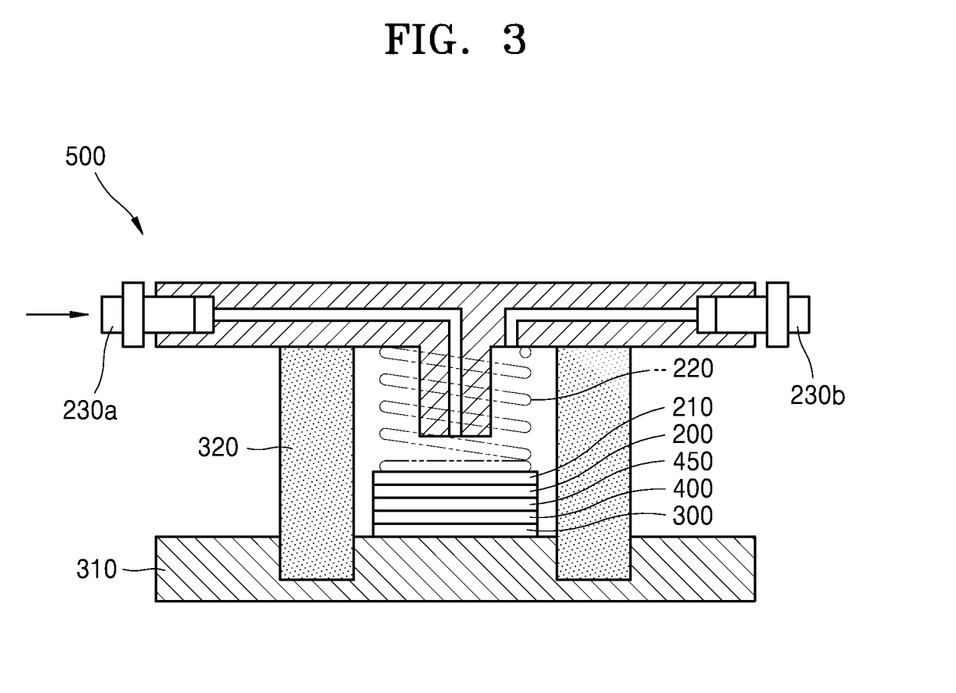
FIG. 3 is a schematic view illustrating the structure of a lithium-air battery according to an embodiment of the present disclosure.

FIG. 3 schematically illustrates the structure of a lithium-air battery according to an embodiment. The lithium-air battery 500 includes a cathode 200 adjacent to a first current collector 210 and configured to use oxygen as an active material, an anode 300 adjacent to a second current collector 310 and including lithium, and a first electrolyte layer 400 interposed between the cathode 200 and the anode 300. The first electrolyte layer 400 is a separator impregnated with a liquid electrolyte. A second electrolyte layer 450 is placed between the anode 200 and the first electrolyte layer 400. The second electrolyte layer 450 is a solid electrolyte film having lithium ion conductivity. The first current collector 210 may also serve as a gas diffusion layer that is porous and is capable of diffusing air. A pressing member 220 is placed on the first current collector 210 to transfer air to the cathode. A case 320 made of an insulating resin material is interposed between the cathode 200 and the anode 300 to electrically separate the cathode 200 and the anode 300. Air is supplied into an air inlet 230a and is discharged to the outside through an air outlet 230b. The lithium-air battery may be housed in a stainless steel container.

As used herein, the term "air" is not limited to atmospheric air, and may include a combination of gases including oxygen or pure oxygen gas. The broad definition of this term "air" may be applied to all applications, for example, air batteries, air electrodes, and the like.

A method of preparing a mixed conductor according to an embodiment may include: mixing a precursor of element A, a precursor of element M, and a precursor of element M' to prepare a mixture; and heat-treating the mixture in a solid phase to prepare a mixed conductor. When the mixed conductor is prepared by the solid phase method, it is possible to simply mass-produce the mixed conductor.

The preparing of the mixture may be performed by ball-milling the precursor of element A, the precursor of element M, and the precursor of element M' under an organic solvent and/or an aqueous solution. The organic solvent may be alcohol such as 2-propanol or ethanol, but is not limited thereto. Any suitable organic solvent may be used. The process of reacting the mixture in a solid phase may mean that the reaction proceeds by heat-treatment in the absence of solvent.

The mixed conductor to be prepared refers to the above description.

The precursor of element A may be a salt of A, an oxide of A, or a carbonate of A, the precursor of element M may be a salt of M, an oxide of M, or a carbonate of M, and the precursor of element M' may be a salt of M', an oxide of M', or a carbonate of M'.

The precursor of element A may be, for example, a lithium precursor. Examples of the lithium precursor may include, but are not limited to, $Li_2CO_3$, $LiNO_3$, $LiNO_2$, LiOH, $LiOH.H_2O$, LiH, LiF, LiCl, LiBr, LiI, $CH_3OOLi$, $Li_2O$, $Li_2SO_4$, lithium dicarboxylate, lithium citrate, lithium fatty acid, and alkyl lithium. Any suitable lithium precursor may be used as long as it may be used in the art. For example, the lithium precursor may be LiOH or $Li_2CO_3$.

The precursor of element M may include at least one of alkoxide, chloride, oxide, hydroxide, nitrate, carbonate, and acetate, each including TI or Mn, but is not limited thereto. Any suitable precursor of element M may be used as long as it may be used as a titanium (Ti) precursor or a manganese (Mn) precursor in the art. For example, the precursor of element M may be $TiO_2$, $Mn_2O_3$, or $MnO_2$.

The precursor of element M' may include at least one of an alkoxide, a chloride, an oxide, a hydroxide, a nitrate, a carbonate, or an acetate, each including at least one element of Mg, Ca, Sr, Sc, Y, La, Ce, Pr, Nd, Pm, Sm, Eu, Gd, Tb, Dy, Ho, Er, Tm, Yb, Lu, Cr, Mn, Fe, Ru, Co, Rh, Ni, Pd, Pt, Cu, Ag, Au, Zn, Cd, Hg, Al, Ga, In, TI, Ge, Sn, Pb, Sb, Bi, or Po, but is not limited thereto. Any suitable precursor of element M' may be used as long as it may be used in the art. For example, the precursor of element M' may be $Al_2O_3$, $Mn_2O_3$, or $Ni(OH)_2$.

In a method of preparing a mixed conductor in a solid phase may include: drying the mixture and performing first heat treatment on the dried mixture in an oxidizing atmosphere to prepare a first heat-treated product; pulverizing and pressing the first heat-treated product to prepare a pellet; and performing second heat treatment on the pellet in a) a reducing atmosphere, b) an oxidizing atmosphere, or c) an oxidizing atmosphere and a reducing atmosphere.

In the second heat treatment, a) the reducing atmosphere, b) the oxidizing atmosphere, or c) the oxidizing atmosphere and the reducing atmosphere may be selected depending on the oxidation number of the metal included in a targeted mixed conductor.

a) The reducing atmosphere may be an atmosphere including a reducing gas. The reducing gas may be, for example, hydrogen ($H_2$), but is not limited thereto. Any suitable reducing gas may be used. The reducing atmosphere may be a mixture of a reducing gas and an inert gas. The inert gas may be, for example, nitrogen or argon, but is not limited thereto. Any suitable inert gas may be used. The amount of the reducing gas in the reducing atmosphere may be, for example, about 1 volume percent (vol %) to about 99 vol %, about 2 vol % to about 50 vol %, or about 5 vol % to about 20 vol %, based on the total volume of the reducing atmosphere. Heat-treatment may be carried out under the reducing atmosphere, and thus an oxygen vacancy is introduced into the mixed conductor by the heat treatment may be carried out under the reducing atmosphere.

b) The oxidizing atmosphere may be an atmosphere including an oxidizing gas. The oxidizing gas may be, for example, oxygen or air, but is not limited thereto. Any suitable oxidizing gas may be used as long as it may be used in the art. The oxidizing atmosphere may be a mixture of an oxidizing gas and an inert gas. The inert gas may be the same as the inert gas used in the reducing atmosphere.

c) The second heat treatment in the oxidizing atmosphere and the reducing atmosphere refers to second heat treatment in which the heat treatment in the oxidizing atmosphere and the heat treatment in the reducing atmosphere may be sequentially carried out. The oxidizing atmosphere and the reducing atmosphere may be the same as a) the aforementioned oxidizing atmosphere and b) the aforementioned reducing atmosphere.

The first heat treatment may be carried out, for example, at about 600° C. to about 1000° C., about 700° C. to about 900° C., or about 750° C. to about 850° C. The first heat treatment time may be about 2 hours to about 10 hours, about 3 hours to about 9 hours, about 4 hours to about 8 hours, or about 4 hours to about 6 hours. The second heat treatment may be carried out, for example, at about 700° C.

to about 1400° C., about 800° C. to about 1300° C., about 900° C. to about 1200° C., or about 900° C. to about 1100° C. The second heat treatment time may be about 6 hours to about 48 hours, about 10 hours to about 40 hours, about 15 hours to about 35 hours, or about 20 hours to about 30 hours. The first heat treatment and the second heat treatment may be carried out under these conditions, and thus the electrochemical stability of the prepared mixed conductor is further improved.

Hereinafter, the present disclosure will be described in more detail with reference to Examples and Comparative Examples. However, these examples are set forth to illustrate the present disclosure, and the scope of the present disclosure is not limited thereto.

EXAMPLES

Preparation of Mixed Conductor

Example 1 ($Li_{4.5}Ti_{4.5}Al_{0.5}O_{12-\delta}$)

A lithium precursor $Li_2CO_3$, a titanium precursor $TiO_2$, and an aluminum precursor $Al_2O_3$ were mixed with each other in a stoichiometric ratio, mixed with ethanol, and then pulverized and mixed using a ball mill including zirconia balls at 280 revolutions per minute (rpm) for 4 hours to obtain a mixture. The obtained mixture was dried at 90° C. for 6 hours, and then primarily heat-treated at 700° C. for 5 hours in an air atmosphere. The primarily heat-treated mixture was pulverized for 4 hours using a ball mill, and then pressed at isostatic pressure to obtain pellets. The obtained pellets were secondarily heat-treated at 950° C. for 24 hours in an air atmosphere to prepare a mixed conductor. The composition of the prepared mixed conductor was $Li_{4.5}Ti_{4.5}Al_{0.5}O_{12-\delta}$.

Example 2 ($Li_5Ti_4Al_1O_{12-\delta}$)

A mixed conductor having a composition of $Li_5Ti_4Al_1O_{12-\delta}$ was prepared in the same manner as in Example 1, except that a lithium precursor $Li_2CO_3$, a titanium precursor $TiO_2$, and an aluminum precursor $Al_2O_3$, were mixed with each other in a stoichiometric ratio to have a composition of $Li_5Ti_4Al_1O_{12}$.

Example 3 ($Li_{4.3}Ti_{4.7}Al_{0.3}O_{12-\delta}$)

A mixed conductor having a composition of $Li_{4.3}Ti_{4.7}Al_{0.3}O_{12-\delta}$ was prepared in the same manner as in Example 1, except that a lithium precursor $Li_2CO_3$, a titanium precursor $TiO_2$, and an aluminum precursor $Al_2O_3$, were mixed with each other in a stoichiometric ratio to have a composition of $Li_{4.3}Ti_{4.7}Al_{0.3}O_{12}$.

Example 4 ($Li_5Ti_{4.5}Mn_{0.5}O_{12-\delta}$)

A mixed conductor having a composition of $Li_5Ti_{4.5}Mn_{0.5}O_{12-\delta}$ was prepared in the same manner as in Example 1, except that a lithium precursor $Li_2CO_3$, a titanium precursor $TiO_2$, and a manganese precursor $Mn_2O_3$, were mixed with each other in a stoichiometric ratio to have a composition of $Li_5Ti_{4.5}Mn_{0.5}O_{12}$.

Example 5 ($Li_6Ti_4Mn_1O_{12-\delta}$)

A mixed conductor having a composition of $Li_6Ti_4Mn_1O_{12-\delta}$ was prepared in the same manner as in Example 1, except that a lithium precursor $Li_2CO_3$, a titanium precursor $TiO_2$, and a manganese precursor $Mn_2O_3$, were mixed with each other in a stoichiometric ratio to have a composition of $Li_6Ti_4Mn_1O_{12}$.

Example 6 ($Li_5Ti_4Mn_1O_{12-\delta}$)

A mixed conductor having a composition of $Li_5Ti_4Mn_1O_{12-\delta}$ was prepared in the same manner as in Example 1, except that a lithium precursor $Li_2CO_3$, a titanium precursor $TiO_2$, and a manganese precursor $Mn_2O_3$, were mixed with each other in a stoichiometric ratio to have a composition of $Li_5Ti_4Mn_1O_{12}$.

Example 7 ($Li_5Mn_4Ni_1O_{12-\delta}$)

A mixed conductor having a composition of $Li_5Mn_4Ni_1O_{12-\delta}$ was prepared in the same manner as in Example 1, except that a lithium precursor $Li_2CO_3$, a manganese precursor $Mn_2O_3$, and a nickel precursor $Ni(OH)_2$, were mixed with each other in a stoichiometric ratio to have a composition of $Li_5Mn_4Ni_1O_{12}$.

Comparative Example 1 ($Li_4Ti_5O_{12}$)

Commercially available $Li_4Ti_5O_{12}$ powder was pressed at isostatic pressure in the same manner as in Example 1 to prepare pellets.

Comparative Example 2 ($Li_{4.1}Ti_{4.9}Al_{0.1}O_{12-\delta}$)

A mixed conductor having a composition of $Li_{4.1}Ti_{4.9}Al_{0.1}O_{12-\delta}$ was prepared in the same manner as in Example 1, except that a lithium precursor $Li_2CO_3$, a titanium precursor $TiO_2$, and an aluminum precursor $Al_2O_3$, were mixed with each other in a stoichiometric ratio to have a composition of $Li_{4.1}Ti_{4.9}Al_{0.1}O_{12}$.

Comparative Example 3 ($Li_4Ti_4Mn_1O_{12-\delta}$)

A mixed conductor having a composition of $Li_4Ti_4Mn_1O_{12-\delta}$ was prepared in the same manner as in Example 1, except that a lithium precursor $Li_2CO_3$, a titanium precursor $TiO_2$, and a manganese precursor $Mn_2O_3$, were mixed with each other in a stoichiometric ratio to have a composition of $Li_4Ti_4MnO_{12}$.

Evaluation Example 1: Evaluation of Electronic Conductivity

Gold (Au) was sputtered on both sides of each of the mixed conductor pellets prepared in Examples 1 to 7 and Comparative Examples 1 to 3 to complete an ion blocking cell. The electronic conductivity thereof was measured using a DC polarization method.

The time dependent current obtained when a constant voltage of 100 millivolts (mV) was applied to the completed symmetric cell for 30 minutes was measured. The electronic resistance of the mixed conductor was calculated from the measured current, and the electronic conductivity of the mixed conductor was calculated from the calculated electronic resistance. The calculated electronic conductivity is given in Table 1 below.

Evaluation Example 2: Evaluation of Ionic Conductivity

A separator layer impregnated with a liquid electrolyte (1 mole (M) LiTFSI in propylene carbonate (PC)) was placed on both sides of each of the mixed conductor pellets prepared in Examples 1 to 7 and Comparative Examples 1 to 3, and a stainless steel current collector was placed on an electrolyte layer to complete an ion blocking cell. The ionic conductivity thereof was measured using a direct current (DC) polarization method.

The time dependent current obtained when a constant voltage of 100 mV was applied to the completed symmetric cell for 30 minutes was measured. After the resistance of the cell was calculated from the measured current, the ionic resistance of the cell was subtracted from the ionic resistance of a solid electrolyte layer to calculate the ionic resistance of the mixed conductor, and the ionic conductivity was calculated from the calculated ionic resistance. The calculated ionic conductivity is given in Table 1 below.

TABLE 1

|  | Composition | Electronic conductivity (S/cm) | Ionic conductivity (S/cm) |
|---|---|---|---|
| Example 1 | $Li_{4.5}Ti_{4.5}Al_{0.5}O_{12-\delta}$ | $2.78 \times 10^{-5}$ | $1.98 \times 10^{-6}$ |
| Example 2 | $Li_5Ti_4Al_1O_{12-\delta}$ | $2.67 \times 10^{-5}$ | $4.5 \times 10^{-6}$ |
| Example 3 | $Li_{4.3}Ti_{4.7}Al_{0.3}O_{12-\delta}$ | $5.10 \times 10^{-5}$ | $7.62 \times 10^{-7}$ |
| Example 4 | $Li_5Ti_{4.5}Mn_{0.5}O_{12-\delta}$ | $5.41 \times 10^{-5}$ | $5.46 \times 10^{-7}$ |
| Example 5 | $Li_6Ti_4Mn_1O_{12-\delta}$ | $1.55 \times 10^{-5}$ | $4.59 \times 10^{-6}$ |
| Example 6 | $Li_5Ti_4Mn_1O_{12-\delta}$ | $5.81 \times 10^{-6}$ | $1.04 \times 10^{-6}$ |
| Example 7 | $Li_5Mn_4Ni_1O_{12-\delta}$ | $8.51 \times 10^{-6}$ | $8.45 \times 10^{-6}$ |
| Comparative Example 1 | $Li_4Ti_5O_{12}$ | $4.3 \times 10^{-9}$ | $6.8 \times 10^{-8}$ |
| Comparative Example 2 | $Li_{4.1}Ti_{4.9}Al_{0.1}O_{12-\delta}$ | $1.71 \times 10^{-5}$ | $1.48 \times 10^{-6}$ |
| Comparative Example 3 | $Li_4Ti_4Mn_1O_{12-\delta}$ | $6.83 \times 10^{-8}$ | $8.47 \times 10^{-8}$ |

As shown in Table 1 above, the mixed conductors prepared in Examples 1 to 7 were improved in both, electronic conductivity and ionic conductivity, as compared with those of the conductors of Comparative Examples 1 to 3.

Evaluation Example 3: Evaluation of XRD Spectrum

Figure 1:
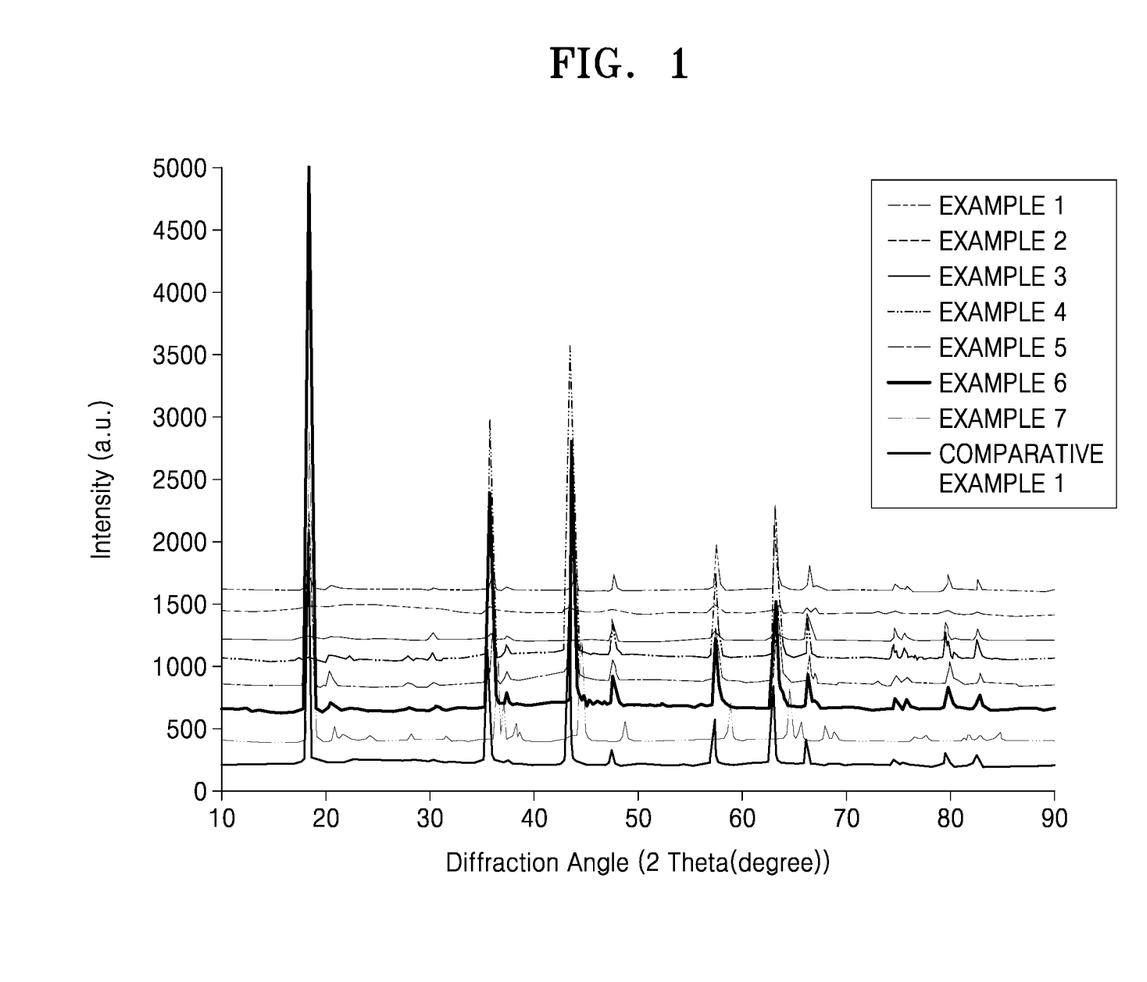
FIG. 1 is a graph of intensity (arbitrary units, a.u.) vs. diffraction angle (degrees 2-theta) showing the results of an X-ray diffraction (XRD) analysis of mixed conductors prepared in Examples 1 to 7 and Comparative Example 1.

X-ray diffraction (XRD) spectra of the mixed conductors of Examples 1 to 7 and Comparative Example 1 were measured, and the results thereof are shown in FIG. 1. Cu Kα radiation was used in the measurement of XRD spectra.

As shown in FIG. 1, the mixed conductors of Examples 1 to 7 show substantially the same spectral pattern as $Li_4Ti_5O_2$ having a spinel crystal structure of Comparative Example 1. Therefore, it may be found that each of the mixed conductors of Examples 1 to 7 maintain a spinel crystal structure even when a part of Ti or Mn element is substituted with element M'.

According to an embodiment, when the mixed conductor that is chemically stable and simultaneously transfer ions and electrons is used, the deterioration of the electrochemical devices is inhibited.

It should be understood that embodiment described herein should be considered in a descriptive sense only and not for purposes of limitation. Descriptions of features or aspects within each embodiment should be considered as available for other similar features or aspects in the disclosed embodiment.

While an embodiment has been described with reference to the figures, it will be understood by those of ordinary skill in the art that various changes in form and details may be made therein without departing from the spirit and scope as defined by the following claims.

What is claimed is:

1. An electrochemical device comprising a cathode, the cathode comprising a mixed conductor represented by Formula 1:

$$A_{4+x}M_{5-y}M'_yO_{12-\delta} \qquad \text{Formula 1}$$

wherein, in Formula 1,
A is a first monovalent cation;
M is at least one of a divalent cation, a trivalent cation, or a tetravalent cation, provided that M is not Fe;
M' is at least one of a second monovalent cation, a divalent cation, a trivalent cation, a tetravalent cation, a pentavalent cation, or a hexavalent cation, provided that M' is not Fe;
M and M' are different from each other; and
$0.3 \leq x < 3$, $0.01 < y < 2$, and $0 \leq \delta \leq 1$ are satisfied.

2. The electrochemical device of claim 1, wherein the first monovalent cation is a monovalent alkali metal cation, the second monovalent cation is a monovalent alkali metal cation, or both the first monovalent cation and the second monovalent cation are both independently a monovalent alkali metal cation.

3. The electrochemical device of claim 2, wherein the first monovalent cation comprises at least one of Li, Na, and K; the second monovalent cation comprises at least one of Li, Na, and K; or both the first monovalent cation and the second monovalent cation each independently comprises at least one of Li, Na, and K.

4. The electrochemical device of claim 1, wherein M' is at least one of Mg, Ca, Sr, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Tc, Re, Ru, Os, Co, Rh, Ir, Ni, Pd, Pt, Cu, Ag, Au, Zn, Cd, Hg, Al, Ga, In, Tl, Ge, Sn, Pb, Sb, Bi, or Po.

5. The electrochemical device of claim 1,
wherein M and M' are cations having different oxidation numbers from each other.

6. The electrochemical device of claim 1,
wherein M is a trivalent cation or a tetravalent cation.

7. The electrochemical device of claim 6,
wherein the mixed conductor is represented by Formula 2 or Formula 3:

$$Li_{4+x}Ti_{5-y}M1_yO_{12-\delta} \qquad \text{Formula 2}$$

$$Li_{4+x}Mn_{5-y}M2_yO_{12-\delta} \qquad \text{Formula 3}$$

wherein, in Formulae 2 and 3,
M1 is at least one of Mg, Ca, Sr, Sc, Y, La, Ce, Pr, Nd, Pm, Sm, Eu, Gd, Tb, Dy, Ho, Er, Tm, Yb, Lu, Zr, Hf, V, Nb, Ta, Cr, Mo, W, Mn, Tc, Re, Ru, Os, Co, Rh, Ir, Ni, Pd, Pt, Cu, Ag, Au, Zn, Cd, Hg, Al, Ga, In, Tl, Ge, Sn, Pb, Sb, Bi, or Po,
M2 is at least one of Mg, Ca, Sr, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Tc, Re, Ru, Os, Co, Rh, Ir, Ni, Pd, Pt, Cu, Ag, Au, Zn, Cd, Hg, Al, Ga, In, Tl, Ge, Sn, Pb, Sb, Bi, or Po, and
$0.3 \leq x < 3$, $0.01 < y < 2$, and $0 \leq \delta \leq 1$ are satisfied.

8. The electrochemical device of claim 1,
wherein the mixed conductor includes at least one of $Li_{4+x}Ti_{5-y}Ag_yO_{12-\delta}$ wherein $0.3 \leq x < 3$, $0.01 < y < 2$, and $0 \leq \delta \leq 1$; $Li_{4+x}Ti_{5-y}Mg_yO_{12-\delta}$ wherein $0.3 \leq x < 3$, $0.01 < y < 2$, and $0 \leq \delta \leq 1$; $Li_{4+x}Ti_{5-y}Ca_yO_{12-\delta}$ wherein $0.3 \leq x < 3$, $0.01 < y < 2$, and $0 \leq \delta \leq 1$; $Li_{4+x}Ti_{5-y}Sr_yO_{12-\delta}$ wherein $0.3 \leq x < 3$, $0.01 < y < 2$, and $0 \leq \delta \leq 1$; $Li_{4+x}Ti_{5-y}Mn_yO_{12-\delta}$ wherein $0.3 \leq x < 3$, $0.01 < y < 2$, and $0 \leq \delta \leq 1$; $Li_{4+x}Ti_{5-y}Pd_yO_{12-\delta}$ wherein $0.3 \leq x < 3$, $0.01 < y < 2$, and $0 \leq \delta \leq 1$; $Li_{4+x}Ti_{5-y}Pt_yO_{12-\delta}$ wherein $0.3 \leq x < 3$, $0.01 < y < 2$, and $0 \leq \delta \leq 1$; $Li_{4+x}Ti_{5-y}Cu_yO_{12-\delta}$ wherein $0.3 \leq x < 3$, $0.01 < y < 2$, and $0 \leq \delta \leq 1$; $Li_{4+x}Ti_{5-y}Zn_yO_{12-\delta}$ wherein $0.3 \leq x < 3$, $0.01 < y < 2$, and $0 \leq \delta \leq 1$; $Li_{4+x}Ti_{5-y}Cd_yO_{12-\delta}$ wherein $0.3 \leq x < 3$, $0.01 < y < 2$, $0 \leq \delta \leq 1$; $Li_{4+x}Ti_{5-y}Hg_yO_{12-\delta}$ wherein $0.3 \leq x < 3$, $0.01 < y < 2$, and $0 \leq \delta \leq 1$; $Li_{4+x}Ti_{5-y}Ge_yO_{12-\delta}$ wherein $0.3 \leq x < 3$, $0.01 < y < 2$, $0 \leq \delta \leq 1$; $Li_{4+x}Ti_{5-y}Sn_yO_{12-\delta}$ wherein $0.3 \leq x < 3$, $0.01 < y < 2$, $0 \leq \delta \leq 1$; $Li_{4+x}Ti_{5-y}Pb_yO_{12-\delta}$ wherein $0.3 \leq x < 3$, $0.01 < y < 2$, $0 \leq \delta \leq 1$; $Li_{4+x}Ti_{5-y}Po_yO_{12-\delta}$ wherein $0.3 \leq x < 3$, $0.01 < y < 2$, $0 \leq \delta \leq 1$; $Li_{4+x}Ti_{5-y}Sc_yO_{12-\delta}$ wherein $0.3 \leq x < 3$, $0.01 < y < 2$, $0 \leq \delta \leq 1$; $Li_{4+x}Ti_{5-y}Y_yO_{12-\delta}$ wherein $0.3 \leq x < 3$, $0.01 < y < 2$, $0 \leq \delta \leq 1$; $Li_{4+x}Ti_{5-y}La_yO_{12-\delta}$ wherein $0.3 \leq x < 3$, $0.01 < y < 2$, $0 \leq \delta \leq 1$; $Li_{4+x}Ti_{5-y}Ce_yO_{12-\delta}$ wherein $0.3 \leq x < 3$, $0.01 < y < 2$, $0 \leq \delta \leq 1$; $Li_{4+x}Ti_{5-y}Pr_yO_{12-\delta}$ wherein $0.3 \leq x < 3$, $0.01 < y < 2$, $0 \leq \delta \leq 1$; $Li_{4+x}Ti_{5-y}Nd_yO_{12-\delta}$ wherein $0.3 \leq x < 3$, $0.01 < y < 2$, $0 \leq \delta \leq 1$; $Li_{4+x}Ti_{5-y}Pm_yO_{12-\delta}$ wherein $0.3 \leq x < 3$, $0.01 < y < 2$, $0 \leq \delta \leq 1$; $Li_{4+x}Ti_{5-y}Sm_yO_{12-\delta}$ wherein $0.3 \leq x < 3$, $0.01 < y < 2$, $0 \leq \delta \leq 1$; $Li_{4+x}Ti_{5-y}Eu_yO_{12-\delta}$ wherein $0.3 \leq x < 3$, $0.01 < y < 2$, $0 \leq \delta \leq 1$; $Li_{4+x}Ti_{5-y}Gd_yO_{12-\delta}$ wherein $0.3 \leq x < 3$, $0.01 < y < 2$, $0 \leq \delta \leq 1$; $Li_{4+x}Ti_{5-y}Tb_yO_{12-\delta}$ wherein $0.3 \leq x < 3$, $0.01 < y < 2$, $0 \leq \delta \leq 1$; $Li_{4+x}Ti_{5-y}Dy_yO_{12-\delta}$ wherein $0.3 \leq x < 3$, $0.01 < y < 2$, $0 \leq \delta \leq 1$; $Li_{4+x}Ti_{5-y}Ho_yO_{12-\delta}$ wherein $0.3 \leq x < 3$, $0.01 < y < 2$, $0 \leq \delta \leq 1$; $Li_{4+x}Ti_{5-y}Er_yO_{12-\delta}$ wherein $0.3 \leq x < 3$, $0.01 < y < 2$, $0 \leq \delta \leq 1$; $Li_{4+x}Ti_{5-y}Tm_yO_{12-\delta}$ wherein $0.3 \leq x < 3$, $0.01 < y < 2$, $0 \leq \delta \leq 1$; $Li_{4+x}Ti_{5-y}Yb_yO_{12-\delta}$ wherein $0.3 \leq x < 3$, $0.01 < y < 2$, $0 \leq \delta \leq 1$;

$Li_{4+x}Ti_{5-y}Lu_yO_{12-\delta}$ wherein $0.3 \leq x < 3$, $0.01 < y < 2$, $0 \leq \delta \leq 1$; $Li_{4+x}Ti_{5-y}Cr_yO_{12-\delta}$ wherein $0.3 \leq x < 3$, $0.01 < y < 2$, $0 \leq \delta \leq 1$; $Li_{4+x}Ti_{5-y}Ru_yO_{12-\delta}$ wherein $0.3 \leq x < 3$, $0.01 < y < 2$, $0 \leq \delta \leq 1$; $Li_{4+x}Ti_{5-y}Co_yO_{12-\delta}$ wherein $0.3 \leq x < 3$, $0.01 < y < 2$, $0 \leq \delta \leq 1$; $Li_{4+x}Ti_{5-y}Rh_yO_{12-\delta}$ wherein $0.3 \leq x < 3$, $0.01 < y < 2$, $0 \leq \delta \leq 1$; $Li_{4+x}Ti_{5-y}Ni_yO_{12-\delta}$ wherein $0.3 \leq x < 3$, $0.01 < y < 2$, $0 \leq \delta \leq 1$; $Li_{4+x}Ti_{5-y}Au_yO_{12-\delta}$ wherein $0.3 \leq x < 3$, $0.01 < y < 2$, $0 \leq \delta \leq 1$; $Li_{4+x}Ti_{5-y}Al_yO_{12-\delta}$ wherein $0.3 \leq x < 3$, $0.01 < y < 2$, $0 \leq \delta \leq 1$; $Li_{4+x}Ti_{5-y}Ga_yO_{12-\delta}$ wherein $0.3 \leq x < 3$, $0.01 < y < 2$, $0 \leq \delta \leq 1$; $Li_{4+x}Ti_{5-y}In_yO_{12-\delta}$ wherein $0.3 \leq x < 3$, $0.01 < y < 2$, $0 \leq \delta \leq 1$; $Li_{4+x}Ti_{5-y}Tl_yO_{12-\delta}$ wherein $0.3 \leq x < 3$, $0.01 < y < 2$, $0 \leq \delta \leq 1$; $Li_{4+x}Ti_{5-y}Sb_yO_{12-\delta}$ wherein $0.3 \leq x < 3$, $0.01 < y < 2$, $0 \leq \delta \leq 1$; $Li_{4+x}Ti_{5-y}Bi_yO_{12-\delta}$ wherein $0.3 \leq x < 3$, $0.01 < y < 2$, $0 \leq \delta \leq 1$; $Li_{4+x}Ti_{5-y}Zr_yO_{12-\delta}$ wherein $0.3 \leq x < 3$, $0.01 < y < 2$, $0 \leq \delta \leq 1$; $Li_{4+x}Ti_{5-y}Hf_yO_{12-\delta}$ wherein $0.3 \leq x < 3$, $0.01 < y < 2$, $0 \leq \delta \leq 1$; $Li_{4+x}Ti_{5-y}V_yO_{12-\delta}$ wherein $0.3 \leq x < 3$, $0.01 < y < 2$, $0 \leq \delta \leq 1$; $Li_{4+x}Ti_{5-y}Nb_yO_{12-\delta}$ wherein $0.3 \leq x < 3$, $0.01 < y < 2$, $0 \leq \delta \leq 1$; $Li_{4+x}Ti_{5-y}Ta_yO_{12-\delta}$ wherein $0.3 \leq x < 3$, $0.01 < y < 2$, $0 \leq \delta \leq 1$; $Li_{4+x}Ti_{5-y}Mo_yO_{12-\delta}$ wherein $0.3 \leq x < 3$, $0.01 < y < 2$, $0 \leq \delta \leq 1$; $Li_{4+x}Ti_{5-y}W_yO_{12-\delta}$ wherein $0.3 \leq x < 3$, $0.01 < y < 2$, $0 \leq \delta \leq 1$; $Li_{4+x}Ti_{5-y}Tc_yO_{12-\delta}$ wherein $0.3 \leq x < 3$, $0.01 < y < 2$, $0 \leq \delta \leq 1$; $Li_{4+x}Ti_{5-y}Re_yO_{12-\delta}$ wherein $0.3 \leq x < 3$, $0.01 < y < 2$, $0 \leq \delta \leq 1$; $Li_{4+x}Ti_{5-y}Os_yO_{12-\delta}$ wherein $0.3 \leq x < 3$, $0.01 < y < 2$, $0 \leq \delta \leq 1$; and $Li_{4+x}Ti_{5-y}Ir_yO_{12-\delta}$ wherein $0.3 \leq x < 3$, $0.01 < y < 2$, and $0 \leq \delta \leq 1$); and $Li_{4+x}Mn_{5-y}Ag_yO_{12-\delta}$ wherein $0.3 \leq x < 3$, $0.01 < y < 2$, and $0 \leq \delta \leq 1$; $Li_{4+x}Mn_{5-y}Au_yO_{12-\delta}$ wherein $0.3 \leq x < 3$, $0.01 < y < 2$, and $0 \leq \delta \leq 1$; $Li_{4+x}Mn_{5-y}Tl_yO_{12-\delta}$ wherein $0.3 \leq x < 3$, $0.01 < y < 2$, and $0 \leq \delta \leq 1$; $Li_{4+x}Mn_{5-y}Mg_yO_{12-\delta}$ wherein $0.3 \leq x < 3$, $0.01 < y < 2$, and $0 \leq \delta \leq 1$; $Li_{4+x}Mn_{5-y}Ca_yO_{12-\delta}$ wherein $0.3 \leq x < 3$, $0.01 < y < 2$, and $0 \leq \delta \leq 1$; $Li_{4+x}Mn_{5-y}Sr_yO_{12-\delta}$ wherein $0.3 \leq x < 3$, $0.01 < y < 2$, and $0 \leq \delta \leq 1$; $Li_{4+x}Mn_{5-y}Ru_yO_{12-\delta}$ wherein $0.3 \leq x < 3$, $0.01 < y < 2$, and $0 \leq \delta \leq 1$; $Li_{4+x}Mn_{5-y}Co_yO_{12-\delta}$ wherein $0.3 \leq x < 3$, $0.01 < y < 2$, and $0 \leq \delta \leq 1$; $Li_{4+x}Mn_{5-y}Ni_yO_{12-\delta}$ wherein $0.3 \leq x < 3$, $0.01 < y < 2$, and $0 \leq \delta \leq 1$; $Li_{4+x}Mn_{5-y}Pd_yO_{12-\delta}$ wherein $0.3 \leq x < 3$, $0.01 < y < 2$, and $0 \leq \delta \leq 1$; $Li_{4+x}Mn_{5-y}Pt_yO_{12-\delta}$ wherein $0.3 \leq x < 3$, $0.01 < y < 2$, and $0 \leq \delta \leq 1$;

$Li_{4+x}Mn_{5-y}Cu_yO_{12-\delta}$ wherein $0.3 \leq x < 3$, $0.01 < y < 2$, and $0 \leq \delta \leq 1$; $Li_{4+x}Mn_{5-y}Zn_yO_{12-\delta}$ wherein $0.3 \leq x < 3$, $0.01 < y < 2$, and $0 \leq \delta \leq 1$; $Li_{4+x}Mn_{5-y}Cd_yO_{12-\delta}$ wherein $0.3 \leq x < 3$, $0.01 < y < 2$, and $0 \leq \delta \leq 1$; $Li_{4+x}Mn_{5-y}Hg_yO_{12-\delta}$ wherein $0.3 \leq x < 3$, $0.01 < y < 2$, and $0 \leq \delta \leq 1$; $Li_{4+x}Mn_{5-y}Ge_yO_{12-\delta}$ wherein $0.3 \leq x < 3$, $0.01 < y < 2$, and $0 \leq \delta \leq 1$; $Li_{4+x}Mn_{5-y}Sn_yO_{12-\delta}$ wherein $0.3 \leq x < 3$, $0.01 < y < 2$, and $0 \leq \delta \leq 1$; $Li_{4+x}Mn_{5-y}Pb_yO_{12-\delta}$ wherein $0.3 \leq x < 3$, $0.01 < y < 2$, and $0 \leq \delta \leq 1$; $Li_{4+x}Mn_{5-y}Po_yO_{12-\delta}$ wherein $0.3 \leq x < 3$, $0.01 < y < 2$, and $0 \leq \delta \leq 1$;

$Li_{4+x}Mn_{5-y}Sc_yO_{12-\delta}$ wherein $0.3 \leq x < 3$, $0.01 < y < 2$, and $0 \leq \delta \leq 1$; $Li_{4+x}Mn_{5-y}Y_yO_{12-\delta}$ wherein $0.3 \leq x < 3$, $0.01 < y < 2$, and $0 \leq \delta \leq 1$; $Li_{4+x}Mn_{5-y}La_yO_{12-\delta}$ wherein $0.3 \leq x < 3$, $0.01 < y < 2$, and $0 \leq \delta \leq 1$; $Li_{4+x}Mn_{5-y}Ce_yO_{12-\delta}$ wherein $0.3 \leq x < 3$, $0.01 < y < 2$, and $0 \leq \delta \leq 1$; $Li_{4+x}Mn_{5-y}Pr_yO_{12-\delta}$ wherein $0.3 \leq x < 3$, $0.01 < y < 2$, and $0 \leq \delta \leq 1$; $Li_{4+x}Mn_{5-y}Nd_yO_{12-\delta}$ wherein $0.3 \leq x < 3$, $0.01 < y < 2$, and $0 \leq \delta \leq 1$; $Li_{4+x}Mn_{5-y}Pm_yO_{12-\delta}$ wherein $0.3 \leq x < 3$, $0.01 < y < 2$, and $0 \leq \delta \leq 1$; $Li_{4+x}Mn_{5-y}Sm_yO_{12-\delta}$ wherein $0.3 \leq x < 3$, $0.01 < y < 2$, and $0 \leq \delta \leq 1$;

$Li_{4+x}Mn_{5-y}Eu_yO_{12-\delta}$ wherein $0.3 \leq x < 3$, $0.01 < y < 2$, and $0 \leq \delta \leq 1$; $Li_{4+x}Mn_{5-y}Gd_yO_{12-\delta}$ wherein $0.3 \leq x < 3$, $0.01 < y < 2$, and $0 \leq \delta \leq 1$; $Li_{4+x}Mn_{5-y}Tb_yO_{12-\delta}$ wherein $0.3 \leq x < 3$, $0.01 < y < 2$, and $0 \leq \delta \leq 1$; $Li_{4+x}Mn_{5-y}Dy_yO_{12-\delta}$ wherein $0.3 \leq x < 3$, $0.01 < y < 2$, and $0 \leq \delta \leq 1$; $Li_{4+x}Mn_{5-y}Ho_yO_{12-\delta}$ wherein $0.3 \leq x < 3$, $0.01 < y < 2$, and $0 \leq \delta \leq 1$; $Li_{4+x}Mn_{5-y}Er_yO_{12-\delta}$ wherein $0.3 \leq x < 3$, $0.01 < y < 2$, and $0 \leq \delta \leq 1$; $Li_{4+x}Mn_{5-y}Tm_yO_{12-\delta}$ wherein $0.3 \leq x < 3$, $0.01 < y < 2$, and $0 \leq \delta \leq 1$; $Li_{4+x}Mn_{5-y}Yb_yO_{12-\delta}$ wherein $0.3 \leq x < 3$, $0.01 < y < 2$, and $0 \leq \delta \leq 1$; $Li_{4+x}Mn_{5-y}Lu_yO_{12-\delta}$ wherein $0.3 \leq x < 3$, $0.01 < y < 2$, and $0 \leq \delta \leq 1$; $Li_{4+x}Mn_{5-y}Ti_yO_{12-\delta}$ wherein $0.3 \leq x < 3$, $0.01 < y < 2$, and $0 \leq \delta \leq 1$; $Li_{4+x}Mn_{5-y}Zr_yO_{12-\delta}$ wherein $0.3 \leq x < 3$, $0.01 < y < 2$, and $0 \leq \delta \leq 1$; $Li_{4+x}Mn_{5-y}Hf_yO_{12-\delta}$ wherein $0.3 \leq x < 3$, $0.01 < y < 2$, and $0 \leq \delta \leq 1$; $Li_{4+x}Mn_{5-y}V_yO_{12-\delta}$ wherein $0.3 \leq x < 3$, $0.01 < y < 2$, and $0 \leq \delta \leq 1$; $Li_{4+x}Mn_{5-y}Nb_yO_{12-\delta}$ wherein $0.3 \leq x < 3$, $0.01 < y < 2$, and $0 \leq \delta \leq 1$; $Li_{4+x}Mn_{5-y}Ta_yO_{12-\delta}$ wherein $0.3 \leq x < 3$, $0.01 < y < 2$, and $0 \leq \delta \leq 1$; $Li_{4+x}Mn_{5-y}Cr_yO_{12-\delta}$ wherein $0.3 \leq x < 3$, $0.01 < y < 2$, and $0 \leq \delta \leq 1$; $Li_{4+x}Mn_{5-y}Mo_yO_{12-\delta}$ wherein $0.3 \leq x < 3$, $0.01 < y < 2$, and $0 \leq \delta \leq 1$; $Li_{4+x}Mn_{5-y}W_yO_{12-\delta}$ wherein $0.3 \leq x < 3$, $0.01 < y < 2$, and $0 \leq \delta \leq 1$; $Li_{4+x}Mn_{5-y}Tc_yO_{12-\delta}$ wherein $0.3 \leq x < 3$, $0.01 < y < 2$, and $0 \leq \delta \leq 1$; $Li_{4+x}Mn_{5-y}Re_yO_{12-\delta}$ wherein $0.3 \leq x < 3$, $0.01 < y < 2$, and $0 \leq \delta \leq 1$; $Li_{4+x}Mn_{5-y}Os_yO_{12-\delta}$ wherein $0.3 \leq x < 3$, $0.01 < y < 2$, and $0 \leq \delta \leq 1$; $Li_{4+x}Mn_{5-y}Rh_yO_{12-\delta}$ wherein $0.3 \leq x < 3$, $0.01 < y < 2$, and $0 \leq \delta \leq 1$; $Li_{4+x}Mn_{5-y}Ir_yO_{12-\delta}$ wherein $0.3 \leq x < 3$, $0.01 < y < 2$, and $0 \leq \delta \leq 1$; $Li_{4+x}Mn_{5-y}Al_yO_{12-\delta}$ wherein $0.3 \leq x < 3$, $0.01 < y < 2$, and $0 \leq \delta \leq 1$; $Li_{4+x}Mn_{5-y}Ga_yO_{12-\delta}$ wherein $0.3 \leq x < 3$, $0.01 < y < 2$, and $0 \leq \delta \leq 1$; $Li_{4+x}Mn_{5-y}In_yO_{12-\delta}$ wherein $0.3 \leq x < 3$, $0.01 < y < 2$, and $0 \leq \delta \leq 1$; $Li_{4+x}Mn_{5-y}Sb_yO_{12-\delta}$ wherein $0.3 \leq x < 3$, $0.01 < y < 2$, and $0 \leq \delta \leq 1$; or $Li_{4+x}Mn_{5-y}Bi_yO_{12-\delta}$ wherein $0.3 \leq x < 3$, $0.01 < y < 2$, and $0 \leq \delta \leq 1$).

9. The electrochemical device of claim 1,
wherein the mixed conductor comprises a phase having a spinel crystal structure.

10. The electrochemical device of claim 1,
wherein the mixed conductor comprises a peak at least a refraction angle of 19.0±2.5° 2-theta, a refraction angle of 36.0±2.5° 2-theta, and a refraction angle of 43.0±2.5° 2-theta in an X-ray powder diffraction (XRD) with Cu Kα radiation.

11. The electrochemical device of claim 1,
wherein the mixed conductor has an electronic conductivity of about $4.5 \times 10^{-9}$ Siemens per centimeter to about $1 \times 10^{-3}$ Siemens per centimeter.

12. The electrochemical device of claim 1,
wherein the mixed conductor has an ionic conductivity of about $7 \times 10^{-8}$ Siemens per centimeter to about $1 \times 10^{-4}$ Siemens per centimeter.

13. The electrochemical device of claim 1,
wherein a bandgap of the mixed conductor between a valence band and a conduction band is less than a bandgap of $Li_4Ti_5O_{12}$.

14. The electrochemical device of claim 1,
wherein a bandgap of the mixed conductor between a valence band and a conduction band is about 2 electron volts to about 1.2 electron volts.

15. The electrochemical device of claim 1, wherein when A is lithium, an activation energy for a lithium transition from a tetrahedral 8a site to another tetrahedral 8a site via an octahedral 16c site is less than an activation energy for a lithium transition from a tetrahedral 8a site to another tetrahedral 8a site via an octahedral 16c site in $Li_4Ti_5O_{12}$.

16. The electrochemical device of claim 1,
wherein the electrochemical device comprises at least one of a battery, an accumulator, a supercapacitor, a fuel cell, a sensor, or an electrochromic device.

17. A method of preparing the electrochemical device of claim 1, wherein the mixed conductor is prepared by a method comprising:
providing a precursor of element A;
providing a precursor of element M;
providing a precursor of element M';
mixing the precursor of element A, the precursor of element M, and the precursor of element M' to prepare a mixture; and
heat-treating the mixture in a solid phase to prepare the mixed conductor,
wherein
A is a monovalent cation;
M is at least one of a divalent cation, a trivalent cation, or a tetravalent cation, provided that M is not Fe;
M' is at least one of a second monovalent cation, a divalent cation, a trivalent cation, a tetravalent cation, a pentavalent cation, or a hexavalent cation, provided that M' is not Fe; and
M and M' are different from each other.

18. The method of claim 17,
wherein the heat-treating the mixture comprises
drying the mixture,
first heat-treating the dried mixture in an oxidizing atmosphere to prepare a first heat-treated product,
pulverizing the first heat-treated product,
pressing the first heat-treated product to prepare a pellet, and
second heat-treating the pellet in a reducing atmosphere, in an oxidizing atmosphere, or in an oxidizing atmosphere and a reducing atmosphere.

19. The method of claim 17,
wherein the precursor of element A is a salt of A or an oxide of A, the precursor of element M is a salt of M or an oxide of M, and the precursor of element M' is a salt of M' or an oxide of M'.

20. The method of claim 18,
wherein the first heat treatment is performed at about 600° C. to about 1000° C. for about 2 hours to about 10 hours, and the second heat treatment is performed at about 700° C. to about 1400° C. for about 6 hours to about 48 hours.

* * * * *